US011711684B2

(12) United States Patent
Maaref et al.

(10) Patent No.: US 11,711,684 B2
(45) Date of Patent: *Jul. 25, 2023

(54) METHOD AND APPARATUS FOR PROVISIONING PHYSICAL SIGNALS AND CHANNELS IN A WIRELESS NETWORK

(71) Applicant: Huawei Technologies Co., Ltd., Guangdong (CN)

(72) Inventors: Amine Maaref, Ottawa (CA); Kelvin Kar Kin Au, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,547

(22) Filed: Jul. 9, 2021

(65) Prior Publication Data

US 2021/0345086 A1 Nov. 4, 2021

Related U.S. Application Data

(63) Continuation of application No. 16/699,840, filed on Dec. 2, 2019, now Pat. No. 11,064,340, which is a (Continued)

(51) Int. Cl.
*H04W 8/00* (2009.01)
*H04W 28/02* (2009.01)
(Continued)

(52) U.S. Cl.
CPC ....... *H04W 8/005* (2013.01); *H04W 28/0215* (2013.01); *H04W 36/0061* (2013.01);
(Continued)

(58) Field of Classification Search
CPC ............. H04W 8/005; H04W 28/0215; H04W 36/0061; H04W 36/0009; H04W 40/12;
(Continued)

(56) References Cited

U.S. PATENT DOCUMENTS 11,064,340 B2 * 7/2021 Maaref ................. H04W 8/005
2012/0243638 A1 * 9/2012 Maltsev .............. H04L 27/2656
375/316

(Continued)

FOREIGN PATENT DOCUMENTS

CN 102448132 A 5/2012
CN 103444095 A 12/2013
(Continued)

OTHER PUBLICATIONS

R1-1611971 Intel Corporation, "Mobility for NR", 3GPP TSG RAN WG1 Meeting #87, Reno, Nevada, U_SA, Nov. 14-18, 2016, 5 pages.

(Continued)

*Primary Examiner* — Khai M Nguyen
(74) *Attorney, Agent, or Firm* — Slater Matsil, LLP

(57) ABSTRACT

Provisioning and communicating physical signals and channels in NR networks having a first subset of transmit and receive points that use a first cell ID and a second subset of transmit and receive points that use a second cell ID. Operations include transmitting from, and receiving from, a first transmit and receive point a first signal or channel wherein the first signal or channel is based on a first user equipment (UE) specific parameter assigned via the first subset of transmit and receive points and transmitting from, and receiving from, the first transmit and receive point the plurality of transmit and receive points a second signal or channel wherein the second signal or channel is based on a second UE specific parameter assigned via the second subset of transmit and receive points. A transmit and receive point and a UE for implementing the operations are also disclosed.

20 Claims, 15 Drawing Sheets

Related U.S. Application Data continuation of application No. 15/594,506, filed on May 12, 2017, now Pat. No. 10,506,418.

(51) Int. Cl.
*H04W 48/10* (2009.01)
*H04W 40/36* (2009.01)
*H04W 40/24* (2009.01)
*H04W 40/12* (2009.01)
*H04W 36/00* (2009.01)
*H04B 1/38* (2015.01)
*H04W 48/20* (2009.01)

(52) U.S. Cl.
CPC ......... *H04W 40/12* (2013.01); *H04W 40/244* (2013.01); *H04W 40/36* (2013.01); *H04W 48/10* (2013.01); *H04B 1/38* (2013.01); *H04W 36/0009* (2018.08); *H04W 48/20* (2013.01)

(58) Field of Classification Search
CPC ............... H04W 40/244; H04W 40/36; H04W 48/10; H04W 48/20; H04B 1/38
See application file for complete search history.

(56) References Cited

U.S. PATENT DOCUMENTS

| | | | |
|---|---|---|---|
| 2013/0013797 A1 | 1/2013 | Henttonen | |
| 2013/0114429 A1 | 5/2013 | Jonsson | |
| 2013/0344877 A1* | 12/2013 | Ma | H04W 16/04 455/446 |
| 2014/0092866 A1 | 4/2014 | Teyek | |
| 2015/0056997 A1 | 2/2015 | Su | |
| 2015/0141002 A1 | 5/2015 | Ma | |
| 2015/0282058 A1 | 10/2015 | Forsell | |
| 2016/0007138 A1 | 1/2016 | Palanisamy | |
| 2016/0249279 A1 | 8/2016 | Koorapaty | |
| 2017/0265166 A1 | 9/2017 | Hosseini | |
| 2017/0332283 A1 | 11/2017 | Kubota | |
| 2017/0332371 A1 | 11/2017 | Kubota | |
| 2017/0347391 A1 | 11/2017 | Tenny et al. | |
| 2017/0353343 A1 | 12/2017 | Cezanne | |
| 2018/0014218 A1 | 1/2018 | Kubota | |
| 2018/0048375 A1 | 2/2018 | Guo | |
| 2018/0048413 A1 | 2/2018 | Liu | |
| 2018/0288654 A1 | 10/2018 | Shih | |
| 2018/0317212 A1 | 11/2018 | Kazmi | |
| 2018/0332515 A1 | 11/2018 | Au | |
| 2018/0352491 A1 | 12/2018 | Shih | |
| 2019/0075526 A1 | 3/2019 | Nagaraj | |
| 2019/0090150 A1 | 3/2019 | Axen | |
| 2019/0132066 A1 | 5/2019 | Park | |

FOREIGN PATENT DOCUMENTS

| | | | |
|---|---|---|---|
| CN | 104509167 A | | 4/2015 |
| CN | 106416377 A | | 2/2017 |
| JP | 6343533 B2 | * | 6/2018 |
| WO | 2014090326 A1 | | 6/2014 |
| WO | 2016208997 A1 | | 12/2016 |

OTHER PUBLICATIONS

ISNCN, International Search Report and Written Opinion for PCT/CN2018/086338 dated Jul. 30, 2018 (9 pages).

U.S. Appl. No. 15/594,510, Non-Final Rejection dated Apr. 3, 2018, pp. 1-22 and attachment.

U.S. Appl. No. 15/594,510, Non-Final Rejection dated Oct. 18, 2018, pp. 1-28 and attachments.

3GPP TR 36.881 V14.0.0, Technical Report 3rd Generation Partnership Project; Technical Specification Group Radio Access Network; Evolved Universal Terrestrial Radio Access (E-UTRA); Study on latency reduction techniques for LTE Release 14), Jun. 2016 (100 pages).

3GPP TSG-RAN WG2 #97 R2-1701804, Agenda Item: 10.3.1.1.2, Source: Huawei, HiSilicon, Qualcomm Incorporated, Sony, Title: UL-based mobility for UEs in active state, Document for: Discussion and Decision, Athens, Greece, Nov. 14-18, 2016 (5 pages).

U.S. Appl. No. 15/594,510, Notice of Allowance dated Jul. 29, 2019, pp. 1-4 and attachments.

ATandT: "Initial Access and Mobility Requirements for NR", 3GPP Draft; R1-1609387, Oct. 9, 2016 (Oct. 9, 2016), XP051149430 (6 pages).

Huawei et al:"Synchronization Signal Design in NR", 3GPP Draft; R1-1608846, Oct. 9, 2016 (Oct. 9, 2016), XP051148900 (6 pages).

Huawei Hisilicon: "Cell definition", 3GPP Draft; R2-168563, Nov. 13, 2016 (Nov. 13, 2016), XP051178138 (6 pages).

European Patent Office. Supplementary European Search Report for Appl. No. 18799381.1 dated Feb. 24, 2020 (12 pages).

* cited by examiner

US 11,711,684 B2

METHOD AND APPARATUS FOR PROVISIONING PHYSICAL SIGNALS AND CHANNELS IN A WIRELESS NETWORK

CROSS REFERENCE TO RELATED APPLICATIONS

This is a continuation of U.S. application Ser. No. 16/699,840, filed Dec. 2, 2019, U.S. Pat. No. 11,064,340, which is a continuation of U.S. application Ser. No. 15/594,506, filed May 12, 2017, U.S. Pat. No. 10,506,418, which are hereby incorporated by reference.

BACKGROUND

When a user equipment (UE) switches from one LTE cell to the next, for example in the case of a handover in wireless communication systems operating in accordance with the 3GPP LTE standard, the cell identifier (Cell ID) and other UE specific parameters associated with communications between the UE and the LTE network change. And given the manner in which physical channels and physical signals are generated are a function of the Cell ID and other UE specific parameters, these channels and signals will change from one cell to the next, for example, in terms of their physical mappings (including the time, frequency and or code resource to employ), scrambling and/or sequences to use. Such channels and signals can include downlink (DL) and uplink (UL) channels, including pilot signals, control channels (e.g. dedicated control channels, common control channels, broadcast channels) and data channels.

Similarly, when switching from one cell to the next when in an idle mode, for example as part of a cell reselection process, the Cell ID associated with communications between the UE and the LTE network changes. One difference from a handover (e.g. in an RRC-CONNECTED mode) is that such UE specific information is not typically used in the case of an idle mode cell reselection.

Contrary to a typical LTE cell serviced by one transmit/receive point with a unique Cell ID, a New Radio (NR) cell for use in an NR system operating in accordance with the 3GPP standards, can include many transmit/receive points using the same NR Cell ID. Given the differences between an NR system and a traditional LTE system, there is a need for improved handover and cell reselection techniques for use in NR systems.

SUMMARY

Figure 1:
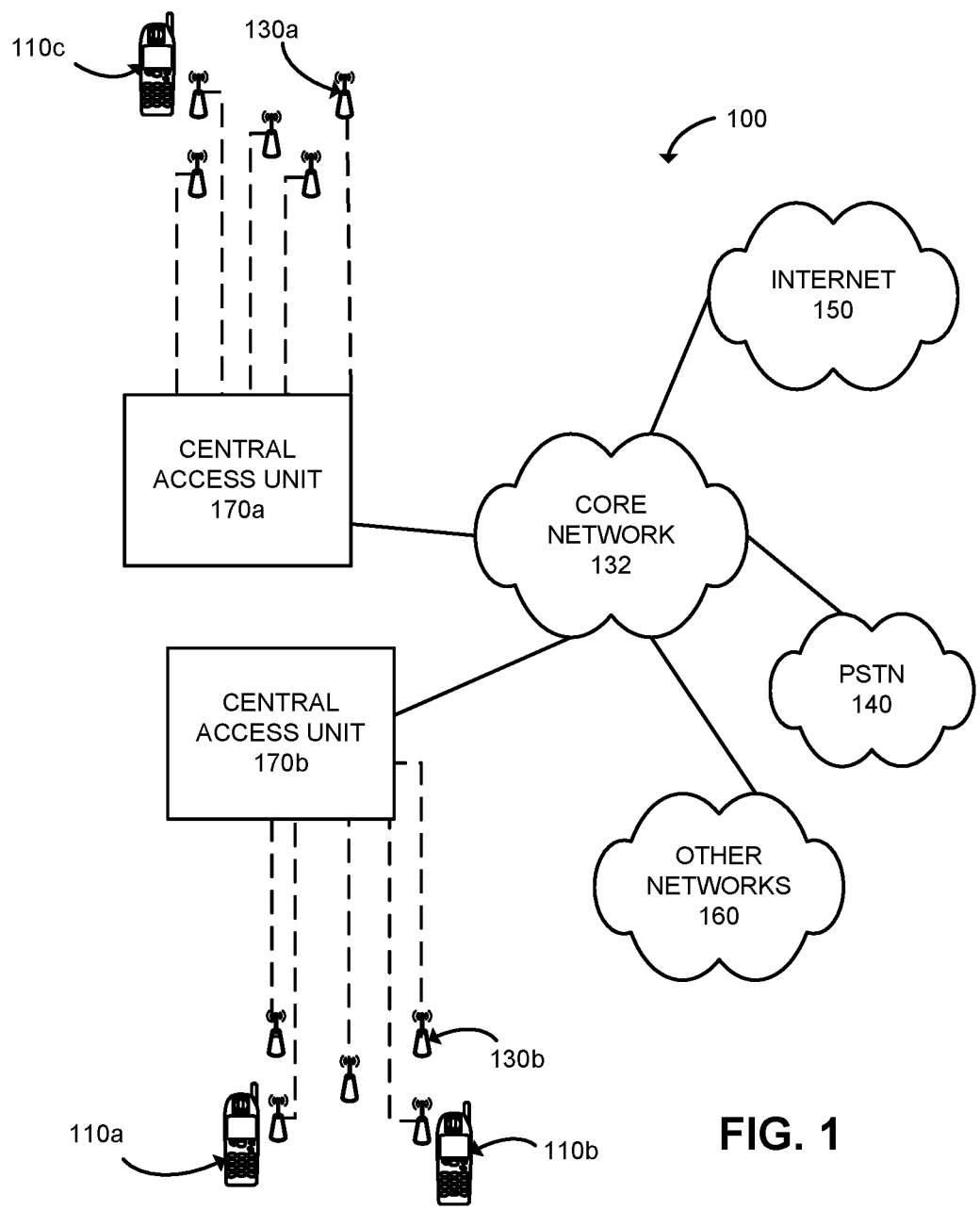
FIG. 1 illustrates an embodiment of a New Radio (NR) network in accordance with the present disclosure.

The present disclosure presents methods and structures that help overcome the difficulties of operating a cellular network with one or more New Radio (NR) cells, also known as hypercells, particularly with respect to a User Equipment (UE) transitioning from communicating with one NR Cell to communicating with another.

According to one aspect of the present disclosure, there is provided a method for communicating signals and channels provisioned in accordance with NR Cell specific and/or UE specific identifiers (IDs) for use in a network including a plurality of transmit and receive points, where a first subset of transmit and receive points of the plurality of transmit and receive points are associated with a first Cell identifier (ID) and where a second subset of transmit and receive points of the plurality of transmit and receive points are associated with a second Cell ID. The method includes transmitting from or receiving at a first transmit and receive point of the plurality of transmit and receive points a first signal or channel wherein the first signal or channel is based on a first user equipment (UE) specific parameter associated with the first subset of transmit and receive points. The method further includes transmitting from or receiving at the first transmit and receive point the plurality of transmit and receive points a second signal or channel wherein the second signal or channel is based on a second UE specific parameter associated with the second subset of transmit and receive points.

According to the described aspect of the present disclosure, transitioning from communicating with one NR Cell to another is more efficient compared to other methods. With prior methods, when a UE transitioned from communicating with one NR Cell to another, the UE would have to synchronize to another synchronization signal and begin transmitting and receiving signals and channels provisioned in accordance with a new Cell ID and new UE specific parameter (e.g. a UE ID). By allowing at least one transmit and receive point associated with one NR Cell to transmit and receive synchronization signals and/or physical signals and channels provisioned in accordance with another NR Cell IDs and/or UE specific parameters assigned by the other NR Cell, the UE and transmit and receive points associated with the NR Cell can avoid having to synchronize and communicate using signals and channels provisioned in accordance with new NR Cell and UE specific parameters. Such an approach avoids having to assign/obtain a new UE specific parameter from the network, and avoids the network and UE having to provision, and determine physical signals and channels provisioned, in accordance with different NR Cell and/or UE specific parameters, and/or having to synchronize to a new synchronization channel. Such an approach can reduce overhead, which can increase spectral efficiency, and can further reduce latency and processing.

In some embodiments of the method according to the above-described aspect of the present disclosure or any other aspects thereof, a number of optional operations and features are employed. One optional feature is that the first signal or channel can be further based on the first Cell ID, wherein the second signal or channel can be further based on the second Cell ID. Another optional feature is the first channel can include a first dedicated control channel and the second channel can include a second dedicated control channel. Another optional feature is that the first channel can include a first data channel and wherein the second channel can include a second data channel.

Another optional feature is the first subset of transmit and receive points transmitting a first synchronization signal and a first broadcast channel associated with the first Cell ID and transmitting from the second subset of transmit and receive points a second synchronization signal and a second broadcast channel associated with the second Cell ID. Another optional feature is transmitting from the first transmit and receive point of the plurality of transmit and receive points the first synchronization signal and the first broadcast channel based on the first Cell ID and the second synchronization signal, and the second broadcast channel based on the second Cell ID.

Another optional feature is to transmit or receive one or more of the first signal or channel, the first synchronization signal and the first broadcast channel by the first transmit and receive point in a first time range and to transmit or receive one or more of the second signal or channel, the second synchronization signal and the second broadcast channel by the first transmit and receive point in a second time range. Another optional feature is to transmit or receive one or more of the first signal or channel, the first synchronization signal and the first broadcast channel by the first transmit and receive point in a first frequency range, and to transmit or receive one or more of the second signal or channel, the second synchronization signal and the second broadcast channel by the first transmit and receive point in a second frequency range. Another optional feature is to transmit or receive one or more of the first signal or channel, the first synchronization signal and the first broadcast channel by the first transmit and receive point in a first carrier frequency range, and to transmit or receive one or more of the second signal or channel, the second synchronization signal and the second broadcast channel by the first transmit and receive point in a second carrier frequency range.

According to another aspect of the present disclosure, there is provided a method for communicating signals and channels provisioned in accordance with NR Cell specific and/or UE specific identifiers (IDs) for use in a network including a plurality of transmit and receive points, where a first subset of transmit and receive points of the plurality of transmit and receive points are associated with a first Cell identifier (ID) and where a second subset of transmit and receive points of the plurality of transmit and receive points are associated with a second Cell ID. The method includes transmitting to or receiving from a first transmit and receive point of the plurality of transmit and receive points a first signal or channel wherein the first signal or channel is based on a first user equipment (UE) specific parameter associated with the first subset of transmit and receive points. The method further includes transmitting to or receiving from the first transmit and receive point the plurality of transmit and receive points a second signal or channel wherein the second signal or channel is based on a second UE specific parameter associated with the second subset of transmit and receive points.

According to the described aspect of the present disclosure, transitioning from communicating with one NR Cell to another is more efficient compared to other methods. With prior methods, when a UE transitioned from communicating with one NR Cell to another, the UE would have to synchronize to another synchronization signal and begin transmitting and receiving signals and channels provisioned in accordance with a new Cell ID and new UE specific parameter (e.g. a UE ID). By allowing at least one transmit and receive point associated with one NR Cell to transmit and receive synchronization signals and/or physical signals and channels provisioned in accordance with another NR Cell IDs and/or UE specific parameters assigned by the other NR Cell, the UE and transmit and receive points associated with the NR Cell can avoid having to synchronize and communicate using signals and channels provisioned in accordance with new NR Cell and UE specific parameters. Such an approach avoids having to assign/obtain a new UE specific parameter from the network, and avoids the network and UE having to provision and determine physical signals and channels provisioned in accordance with different NR Cell and/or UE specific parameters and/or having to synchronize to a new synchronization channel. Such an approach can reduce overhead, which can increase spectral efficiency, and can further reduce latency and processing.

In some embodiments of the method according to the above-described aspect of the present disclosure or any other aspects thereof, a number of optional operations and features are employed. One optional feature is that the first signal or channel can be further based on the first Cell ID, wherein the second signal or channel can be further based on the second Cell ID. Another optional feature is the first channel can include a first dedicated control channel and the second channel can include a second dedicated control channel. Another optional feature is that the first channel can include a first data channel and wherein the second channel can include a second data channel.

Another optional feature the first subset of transmit and receive points transmitting a first synchronization signal and a first broadcast channel associated with the first Cell ID and the second subset of transmit and receive points transmitting a second synchronization signal and a second broadcast channel associated with the second Cell ID. Another optional feature is receiving from the first transmit and receive point of the plurality of transmit and receive points the first synchronization signal and the first broadcast channel based on the first Cell ID and the second synchronization signal, and the second broadcast channel based on the second Cell ID.

According to another aspect of the present disclosure there is provided a transmit and receive point for use in a network including a plurality of transmit and receive points, where a first subset of transmit and receive points of the plurality of transmit and receive points are associated with a first cell identifier (ID) and where a second subset of transmit and receive points of the plurality of transmit and receive points are associated with a second Cell ID. The transmit and receive point of the plurality of transmit and receive points including processing circuitry, transceiver circuitry and memory. The memory includes instructions for causing the processing circuitry to: (1) transmit or receive, via the transceiver circuitry, a first signal or channel wherein the first signal or channel is based on a first user equipment (UE) specific parameter (e.g. UE ID) associated with the first subset of transmit and receive points; and (2) transmit or receive, via the transceiver circuitry, a second signal or channel wherein the second signal or channel is based on a second UE specific parameter (e.g. UE ID) associated with the second subset of transmit and receive points.

According to the described aspect of the present disclosure, the transmit and receive point more efficiently transitions from communicating with one NR Cell to another compared to other networks. With prior networks, when a UE transitioned from communicating with one NR Cell to another, the UE would have to synchronize to another synchronization signal and begin transmitting and receiving signals and channels provisioned in accordance with a new Cell ID and new UE specific parameter (e.g. a UE ID). By allowing at least one transmit and receive point associated with one NR Cell to transmit and receive synchronization signals and/or physical signals and channels provisioned in accordance with another NR Cell IDs and/or UE specific parameters assigned by another NR Cell, the UE and transmit and receive points associated with the NR Cell can avoid having to synchronize and communicate using signals and channels provisioned in accordance with new NR Cell and UE specific parameters. Such a transmit and receive point avoids having to assign/obtain a new UE specific parameter from the network, and avoids the network and UE having to provision and determine physical signals and channels provisioned in accordance with different NR Cell and/or UE specific parameters and/or having to synchronize to a new synchronization channel. Such a transmit and receive point can reduce overhead, which can increase spectral efficiency, and can further reduce latency and processing.

In some embodiments of the transmit and receive point according to the above-described aspect of the present disclosure or any other aspects thereof, a number of optional operations and features can be supported. One optional feature is that the first signal or channel can be further based on the first Cell ID, wherein the second signal or channel can be further based on the second Cell ID. Another optional feature is the first channel can include a first dedicated control channel and the second channel can include a second dedicated control channel. Another optional feature is that the first channel can include a first data channel and wherein the second channel can include a second data channel.

Another optional feature is the first subset of transmit and receive points transmit a first synchronization signal and a first broadcast channel associated with the first Cell ID and transmit, and the second subset of transmit and receive points transmit a second synchronization signal and a second broadcast channel associated with the second Cell ID. Another optional feature is the memory in the first transmit and receive point includes instructions for causing the processing circuitry to transmit, via the transmit circuitry, the first synchronization signal and the first broadcast channel based on the first Cell ID and the second synchronization signal and the second broadcast channel based on the second Cell ID.

Another optional feature is the memory in the first transmit and receive point includes instructions for causing the processing circuitry to transmit or receive, via the transceiver circuitry, one or more of the first signal or channel, the first synchronization signal and the first broadcast channel by the first transmit and receive point in a first time range and to transmit or receive, via the transceiver circuitry, one or more of the second signal or channel, the second synchronization signal and the second broadcast channel by the first transmit and receive point in a second time range. Another optional feature is the memory in the first transmit and receive point includes instructions for causing the processing circuitry to transmit or receive, via the transceiver circuitry, one or more of the first signal or channel, the first synchronization signal and the first broadcast channel by the first transmit and receive point in a first frequency range, and to transmit or receive, via the transceiver circuitry, one or more of the second signal or channel, the second synchronization signal and the second broadcast channel by the first transmit and receive point in a second frequency range. Another optional feature is the memory in the first transmit and receive point includes instructions for causing the processing circuitry to transmit or receive, via the transceiver circuitry, one or more of the first signal or channel, the first synchronization signal and the first broadcast channel by the first transmit and receive point in a first carrier frequency range, and to transmit or receive, via the transceiver circuitry, one or more of the second signal or channel, the second synchronization signal and the second broadcast channel by the first transmit and receive point in a second carrier frequency range.

According to another aspect of the present disclosure, a user equipment (UE) for use in network including a plurality of transmit and receive points, where a first subset of transmit and receive points of the plurality of transmit and receive points are associated with a first cell identifier (ID) and where a second subset of transmit and receive points of the plurality of transmit and receive points are associated with a second Cell ID. The UE includes processing circuitry, transceiver circuitry and memory. The memory includes instructions for causing the processing circuitry to: (1) transmit or receive, via the transceiver circuitry, a first signal or channel wherein the first signal or channel is based on a first user equipment (UE) specific parameter (e.g. UE ID) associated with the first subset of transmit and receive points; and (2) transmit or receive, via the transceiver circuitry, a second signal or channel wherein the second signal or channel is based on a second UE specific parameter (e.g. UE ID) associated with the second subset of transmit and receive points.

According to the described aspect of the present disclosure, the UE more efficiently transitions from communicating with one NR Cell to another compared to other UEs. With prior UEs, when a UE transitioned from communicating with one NR Cell to another, the UE would have to synchronize to another synchronization signal and begin transmitting and receiving signals provisioned in accordance with a new Cell ID and new UE specific parameter (e.g. a UE ID). By allowing at least one transmit and receive point associated with one NR Cell to transmit and receive synchronization signals and/or physical signals and channels provisioned in accordance with another NR Cell IDs and/or UE specific parameters assigned by the other NR Cell, the UE and transmit and receive points associated with the NR Cell can avoid having to synchronize and communicate using signals and channels provisioned in accordance with new NR Cell and UE specific parameters. Such a UE avoids having to assign/obtain a new UE specific parameter from the network, and avoids the network and UE having to provision and determine physical signals and channels provisioned in accordance with different NR Cell and/or UE specific parameters and/or having to synchronize to a new synchronization channel. Such a network can reduce overhead, which can increase spectral efficiency, and can further reduce latency and processing.

In some embodiments of the UE according to the above-described aspect of the present disclosure or any other aspects thereof, a number of optional operations and features can be supported. One optional feature is that the first signal or channel can be further based on the first Cell ID, wherein the second signal or channel can be further based on the second Cell ID. Another optional feature is the first channel can include a first dedicated control channel and the second channel can include a second dedicated control channel. Another optional feature is that the first channel can include a first data channel and wherein the second channel can include a second data channel.

Another optional structure involves the first subset of transmit and receive points transmitting a first synchronization signal and a first broadcast channel associated with the first Cell ID and the second subset of transmit and receive points transmitting a second synchronization signal and a second broadcast channel associated with the second Cell ID. Another optional feature is the memory of the UE including instructions for causing the processing circuitry to receive, via the receive circuitry, from the first transmit and receive point of the plurality of transmit and receive points the first synchronization signal and the first broadcast channel based on the first Cell ID and the second synchronization signal and the second broadcast channel based on the second Cell ID.

DETAILED DESCRIPTION

Contrary to a typical LTE cell serviced by one transmit/receive point with a unique Cell ID, a New Radio (NR) cell (also known as a hypercell or hyper cell) may include many transmit/receive points (transmit/receive points) using the same NR Cell ID, and may cover a much broader area that a typical LTE cell. In NR systems, these transmit/receive points may or may not utilize remote radio heads. Unlike a remote radio head a transmit/receive point typically includes its own baseband processing and scheduling functionality and can transmit with or without a remote radio head. A remote radio head by comparison cannot communicate independently of a transmit/receive point. Generally, the NR system enables multiple wireless users to transmit and receive data and other content. While FIG. 1 illustrates an architecture for supporting NR Cells, embodiments of the present disclosure are not limited to this architecture. That is to say, other network architectures for supporting NR Cells are also possible.

As shown in FIG. 1, NR system 100 can include user equipment (UE) 110a-110c, transmit/receive points, including transmit/receive points 130a and 130b, central access units 170a and 170b, a core network 132, a public switched telephone network (PSTN) 140, the Internet 150, and other networks 160. Note, however, that the NR system could have more or less UEs, transmit/receive points and/or central access units.

UEs 110a-110c are configured to operate and/or communicate in the system 100. For example, the UEs 110a-110c are configured to transmit and/or receive wireless signals. Each UE 110a-110c represents any suitable end user device and which may also be referred to as a wireless transmit/receive unit (WTRU), mobile station, fixed or mobile subscriber unit and may include a cellular telephone, personal digital assistant (PDA), smartphone, laptop or tablet for example.

Transmit/receive points, including transmit/receive points 130a and 130b, can include (or may be referred to), for example, mobile-relay stations, base stations, Node-Bs, eNodeBs, gNodeBs (sometimes called "gigabit" NodeBs), site controllers, pico transmitters, or femto transmitters, which can be used in conjunction with remote radio heads (RRHs) in some implementations. A RRH can contain radio frequency circuitry plus analog-to-digital/digital-to-analog converters and up/down converters.

In one arrangement, central access unit 170a can control a first group of transmit/receive points, including transmit/receive point 130a, while central access unit 170b can control a second group of transmit/receive points, including transmit/receive point 130b. A central access unit may communicate with transmit/receive points via optical, wireless or other connections. Central access units 170a and 170b could also communicate directly without use of core network 132. Note, while central access units 170a and 170b are shown separate from their respective transmit/receive points, the central access units could alternatively be co-located with one or more of their respective transmit/receive points. Also, though not shown, the transmit/receive points could communicate directly with each other (e.g. through an Xn interface).

All or a subset of transmit/receive points associated with central access units 170a may be assigned, or reassigned, by the central access unit, a common NR Cell ID to form a NR Cell. Similarly, all or a subset of transmit/receive points associated with central access unit 170b may be assigned a different common NR Cell ID to form another NR Cell. Alternatively, all or a subset of transmit/receive points associated with central access units 170a and 170b could be assigned a common NR Cell ID, by one or more of the access units, in which case the NR Cell would have two central access units associated therewith. The transmit/receive points associated with central access unit 170a, 170b, and/or 170a and 170b together, could also support multiple NR Cells by using different subsets of transmit/receive points and assigning different NR Cell IDs to each sub set.

Figure 2:
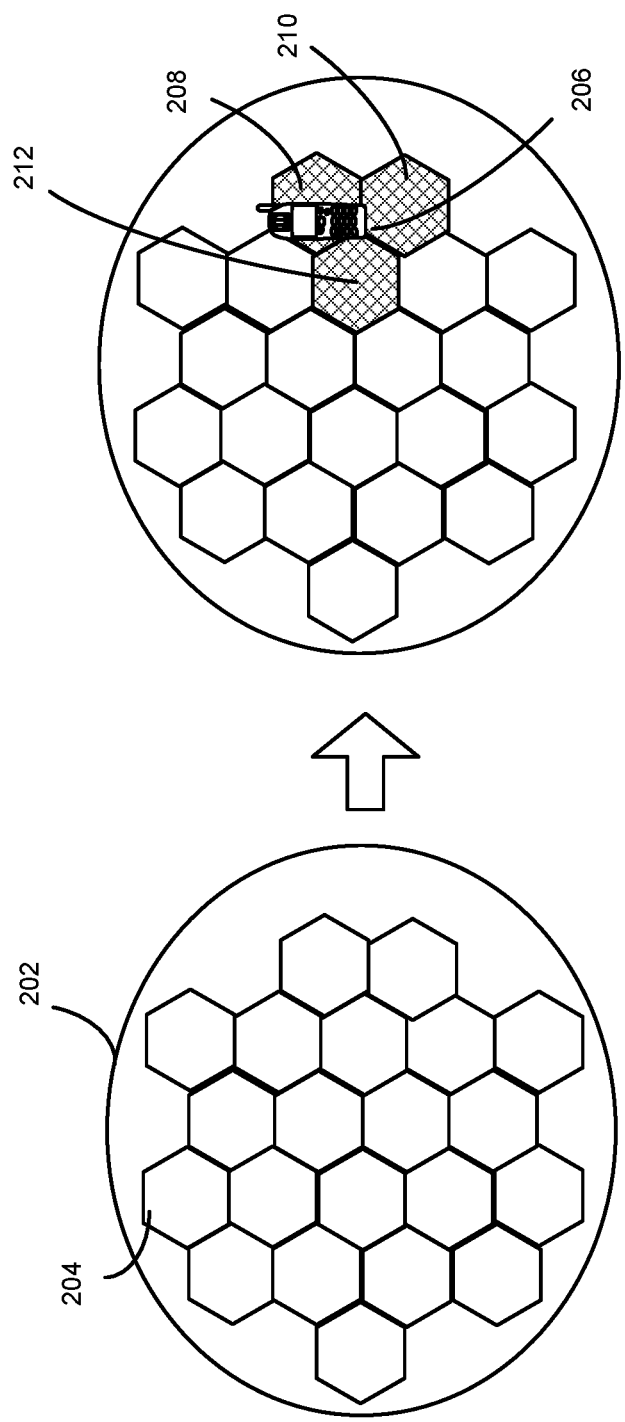
FIG. 2 illustrates an embodiment of a NR Cell in accordance with the present disclosure.

FIG. 2 presents a diagram illustrating an NR Cell in a NR system. A NR cluster 202 includes a number of coverage areas of transmit/receive points, such as coverage area 204. To create a NR Cell, the system (via one or more central access units) assigns a common Cell ID to all the transmit/receive points of the NR cluster that will form the NR Cell. The system may create multiple NR Cells within a NR cluster. FIG. 2 further illustrates transmit/receive points of an NR Cell facilitating data channels and control channels for purposes of communicating with UE 206. As shown therein, the three transmit/receive points 208, 210, and 212 are optimally situated to communicate these channels with UE 206. According to one approach, the system can dynamically combine multiple physical transmitters and receivers to form a virtual transmit/receive point. From the perspective of a UE, the virtual transmit/receive points appear to be a single transmitter/receiver. Similarly, the transmit/receive points of the NR Cell used for receiving UL communications may differ over time and/or for different users. The transmit/receive points used on the UL may differ from those used on the DL. The system may create many different virtual transmit/receive points within a given NR Cell and coordinate their transmissions and receptions, including via use of joint transmissions and receptions, for example so as to manage interference. The system can also dynamically change the physical transmit/receive points that make up the NR Cell.

Figure 3:
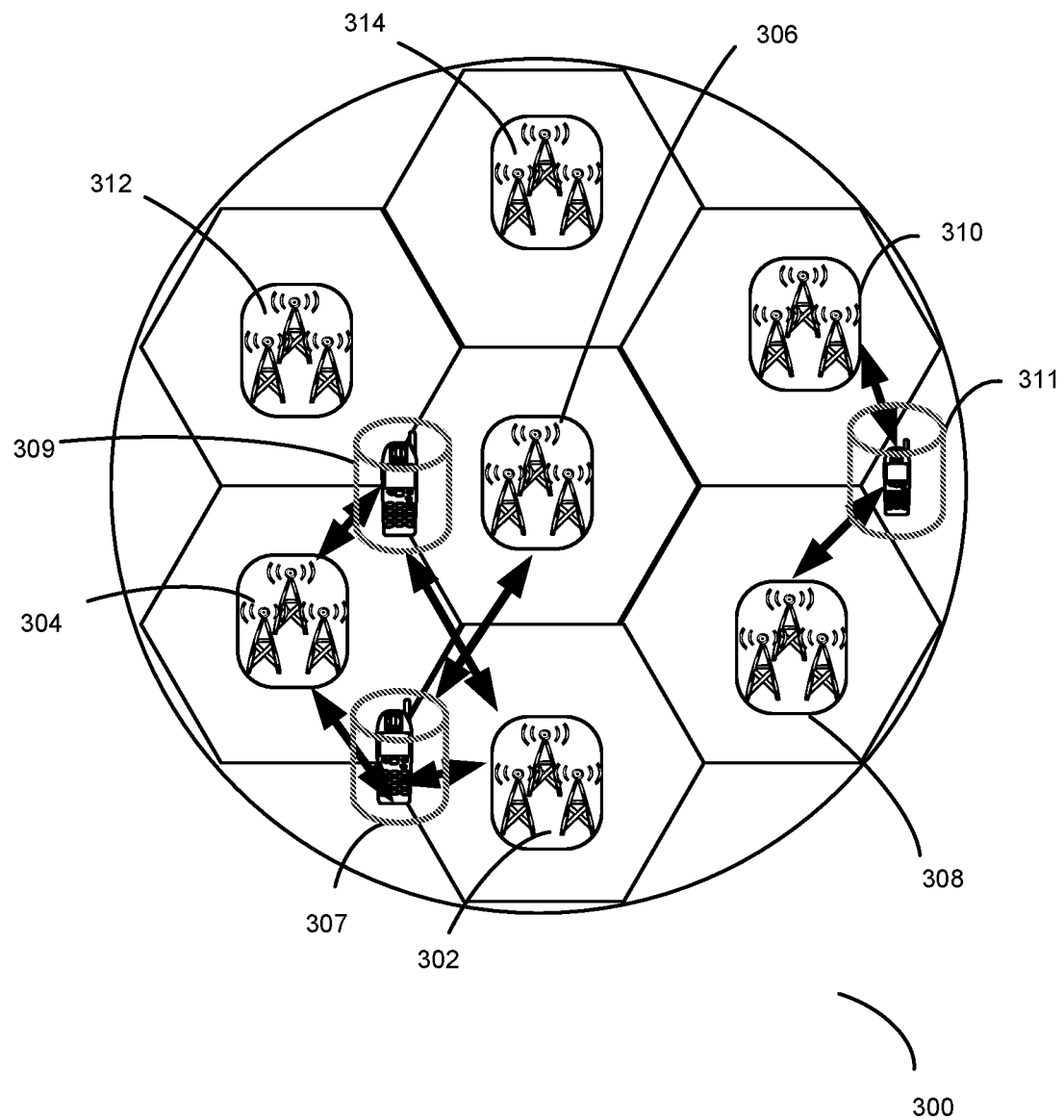
FIG. 3 illustrates another embodiment of a NR Cell in accordance with the present disclosure.

FIG. 3 presents a diagram of an embodiment of an NR Cell that facilitates communications with different sets of transmit/receive points, for purposes of serving different UEs. As noted above with respect to FIG. 2 the NR Cell may utilize one or more different physical transmit/receive points, or different combinations of transmit/receive points, to communicate with different UEs. As the UEs move to different locations, the system can dynamically assign one or more different physical transmit/receive points to service the UEs. For example, as illustrated in FIG. 3, NR Cell 300 is shown supporting three UEs. More specifically, transmit/receive points 302, 304, 306 are shown communicating with UE 307, transmit/receive points 302, 304 are shown communicating with UE 309, and transmit/receive points 308, 310 are shown communicating with UE 311. The central access unit may determine which transmit/receive points to use based on load balancing and UE distribution within a NR Cell.

Figure 4:
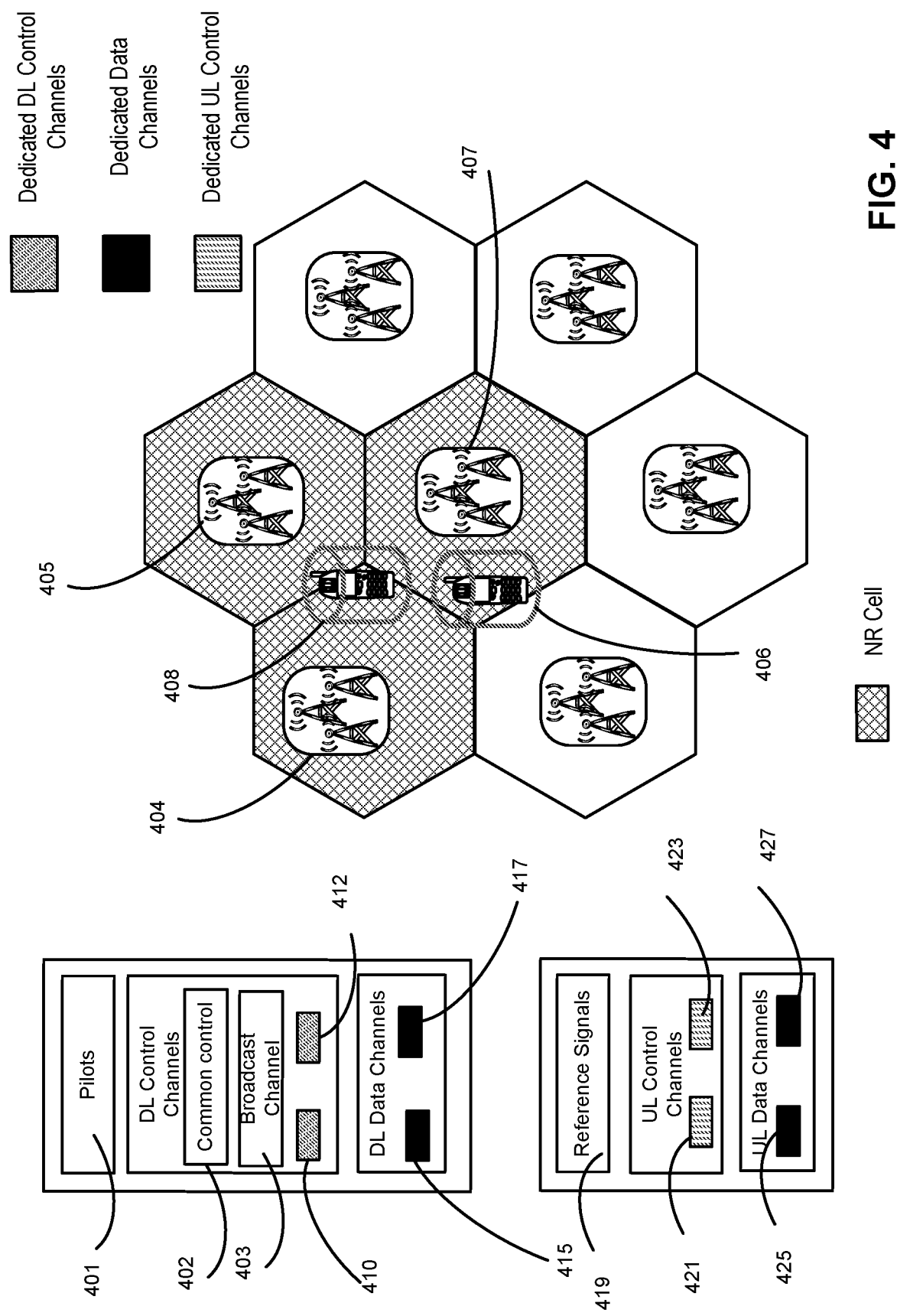
FIG. 4 illustrates another embodiment of a NR Cell in accordance with the present disclosure.

FIG. 4 illustrates another NR Cell communicating with UEs 406 and 408. As shown therein, one or more transmit/receive points of the sets of transmit/receive points 404, 405 and 407 forming the NR cell transmit: pilot signals 401; DL control channels, including common control channel 402, broadcast channel 403, and UE-specific dedicated DL control channel 410 and 412; and UE-specific dedicated DL data channels 415 and 417. Dedicated control channel 410 and DL data channel 415, are specific to UE 406, while dedicated control channel 412 and DL data channel 417, are specific to UE 408. One or more transmit/receive points of the sets of transmit/receive points 404, 405 and 407 can also receive reference signals 419, UE-specific dedicated UL control channels 421 and 423, and UE-specific UL data channels 425 and 427. It is understood that one or more transmit/receive points in the NR cell used for downlink communications, can be the same as, or different from one or more transmit/receive points in the NR cell used for uplink communications. While three transmit/receive points 404, 405 and 407 are shown in FIG. 4 to form the NR cell, it is expressly contemplated that any suitable combination of transmit/receive points may be selected to form the NR cell, and the selection of three transmit/receive points 404, 405 and 407 is purely for the purpose of convenience.

One or more of these signals and channels, including the dedicated control channels and the dedicated data channels, may be generated in accordance with UE specific parameters such as a UE ID (e.g. by scrambling data using the UE ID). Alternatively, or in addition, one or more of these signals and channels may be generated in accordance with a UE specific initialization seed to generate a particular sequence. Alternatively, or in addition, the time, frequency and/or other resources utilized for purposes of these signals and channels may also relate to the UE ID and/or other UE specific parameters.

One or more of the signals and channels can also be generated using an NR Cell ID. An NR Cell ID can be used, without using a UE ID or other UE specific parameter, to distinguish common control channels, broadcast channels, and/or data channels, for example, originating from different NR Cells.

Further, a NR Cell ID can be used together with the UE ID or other UE specific parameters to differentiate transmissions of the NR data channels and/or NR control channels from different NR Cells.

The demodulation of each dedicated control channel may be performed in accordance with a UE-specific reference signal (RS), the sequence and/or location of which are linked to the UE ID or other UE specific parameters or configurable ID.

Broadcast channels may include physical broadcast channel (PBCH) and physical data channel carrying system information. Synchronization signals may include a primary synchronization signal (PSS) and/or a secondary synchronization signal (SSS). The physical broadcast channel typically transmits essential minimum system information that is required for a UE to communicate with the NR system (e.g. the system bandwidth, part of the system frame number, information on where to locate the remaining system information, periodicity of the synchronization signals and synchronization signal block (SS block) time index indication etc.). The NR system may further group the transmission of synchronization signals and PBCH together into an "SS block" (e.g. the PSS, SSS and PBCH are transmitted in consecutive OFDM symbols). Furthermore, in the case of multi-beam transmission (e.g. in high frequency operation), a series of SS blocks can be transmitted in an SS burst set whereby each SS block is transmitted in a particular beam direction. The SS blocks within an SS burst set may contain the same synchronization signals associated with the same NR Cell ID.

Other aspects of implementations of hyper cell, namely NR cell, are proposed in U.S. Pat. No. 8,838,119, entitled "Method and system for dynamic cell configuration", which is hereby incorporated by reference in its entirety.

The NR system may apply transmit/receive point selection techniques and transmit power control techniques to minimize intra-NR Cell interference and inter-NR Cell interference. For a UE with a poor Signal to Interference plus Noise Ratio (SINR), the system can transmit the NR dedicated control channel and/or NR data channel from multiple transmit/receive points jointly to improve signal quality, including using MIMO processing.

Figure 5:
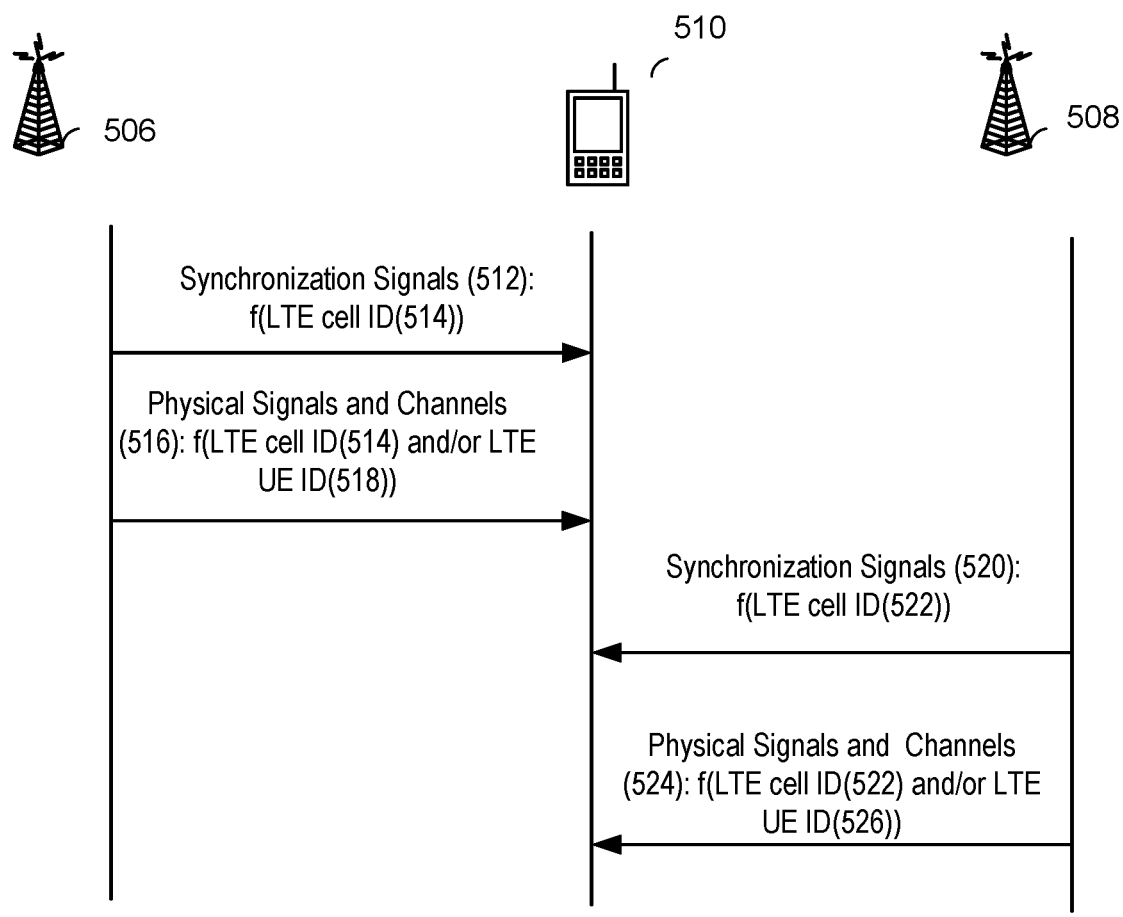
FIG. 5 illustrates synchronization signals and physical signals and channels being transmitted in a wireless network in accordance with the present disclosure.

One benefit to an NR system is that it overcomes the problem of a UE switching between LTE cells, for example, that have unique Cell IDs and that use separate UE specific parameters. As shown in FIG. 5, when UE 510 switches from communicating with eNodeB 506, to communicating with eNodeB 508, the generation of physical signals and physical channels change as a result of the LTE Cell IDs and LTE UE specific parameters changing. For example, UE 510 receives from eNodeB 506 synchronization signals 512 generated as a function of LTE Cell ID 514, and physical signals and channels 516 generated as a function of LTE Cell ID 514 and/or LTE UE specific parameter 518. When UE 510 switches to communicating with eNodeB 508, UE must then receive synchronization signals 520, generated as a function of LTE Cell ID 522, and physical signals and channels 524 generated as a function of LTE Cell ID 522 and/or LTE UE specific parameter 526. The problem with this approach is that it wastes spectral resources, increases latency and increases processing on both the network and UE side (which also drains batteries on the UE side), to obtain the different LTE Cell IDs and LTE UE specific parameters, and to generate physical signals and channels based on these differing IDs. Similarly, utilizing different LTE Cell IDs as part of a cell reselection process also wastes resources and increases processing at the network and UE.

Figure 6:
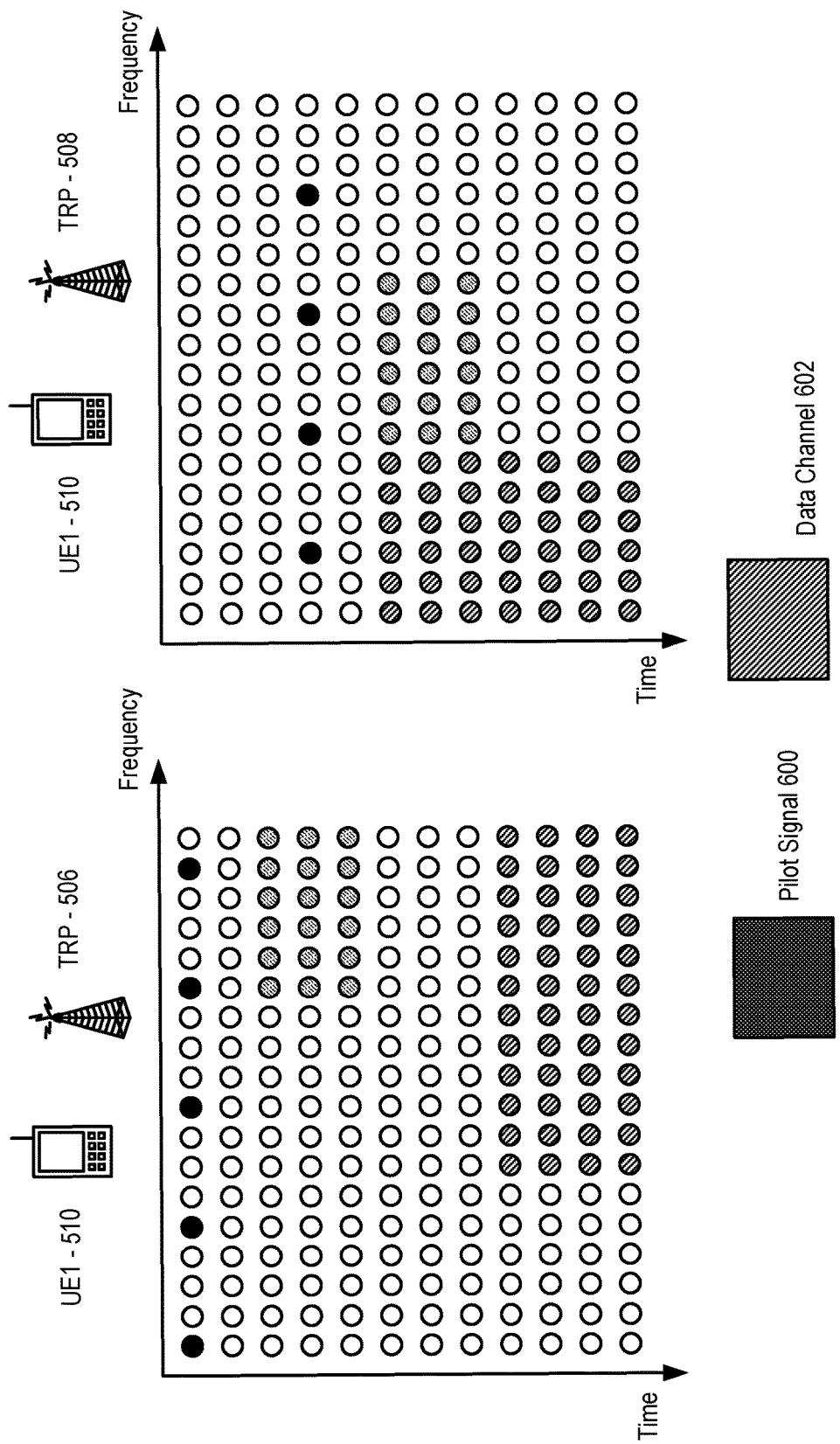
FIGS. 6A and 6B illustrates physical signal and channel mapping in a wireless network in accordance with the present disclosure.

As shown in FIG. 6A and FIG. 6B, as a result of the change in LTE Cell ID and LTE UE specific parameters occurring with UE 510 switching from communicating with eNodeB 506 to communicating with eNodeB 508 as shown in FIG. 5, the respective physical mappings may change (i.e. the time, frequency, code and/or other resource to use). For example, for pilot signal 600, data channel 602 and DL control channel 604, the physical mappings change, in terms of the time and frequency resources used, from a first time period associated with UE 510 communicating with eNodeB 506 shown in FIG. 6A to a second time period associated with UE 510 communicating with eNodeB 508 shown in FIG. 6B. Though not shown in FIG. 6A or B, the scrambling applied and/or sequence to be used for generating these various physical signals and channels can also change, with or without the resources used changing. Also not shown, the resources, scrambling and/or sequences used for UL signals and channels could also change based on changes in LTE Cell ID and LTE UE specific parameters.

Figure 7:
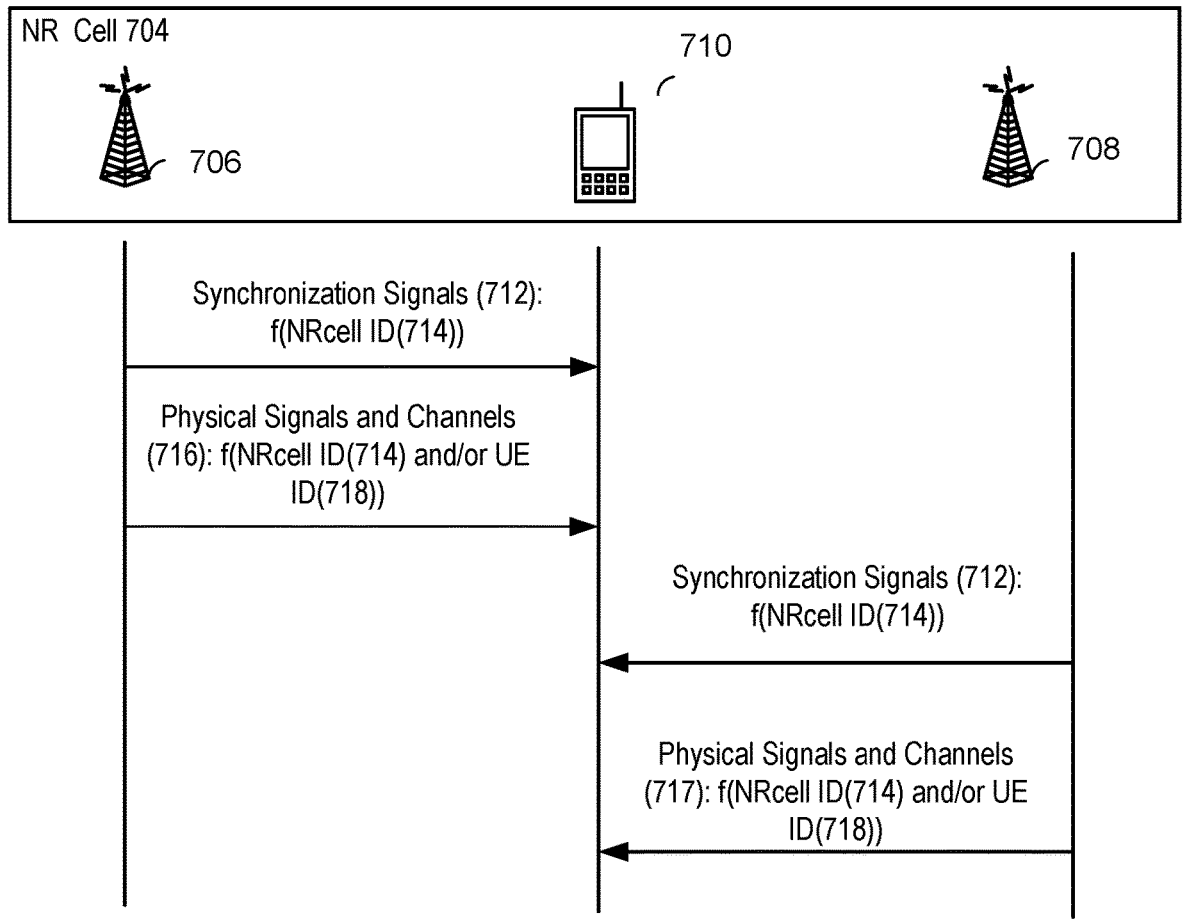
FIG. 7 illustrates synchronization signals and physical signals and channels being transmitted in one NR Cell of a NR network in accordance with the present disclosure.

In the case of an NR Cell, as shown FIG. 7, when UE 710 switches from communicating with one or more transmit/receive points 706 (only one shown) to communicating with one or more other transmit/receive points 708 (only one shown), in NR Cell 704, the NR Cell ID and UE specific parameter (e.g. UE ID) do not change. As such, UE 710 can avoid having to synchronize to new synchronization signals, and transmit/receive point(s) 708 and UE 710 can avoid having to provision and receive, respectively, the physical signals and channels in accordance with a new Cell ID and/or a new UE specific parameter, such as a new UE ID. For example, as shown in FIG. 7, both transmit/receive point(s) 706 and transmit/receive point(s) 708 transmit synchronization signals 712 whose provisioning is a function of NR Cell ID 714, and physical signals and channels 716 and 717 whose provisioning are a function of NR Cell ID 714, and/or UE ID 718.

Figure 8:
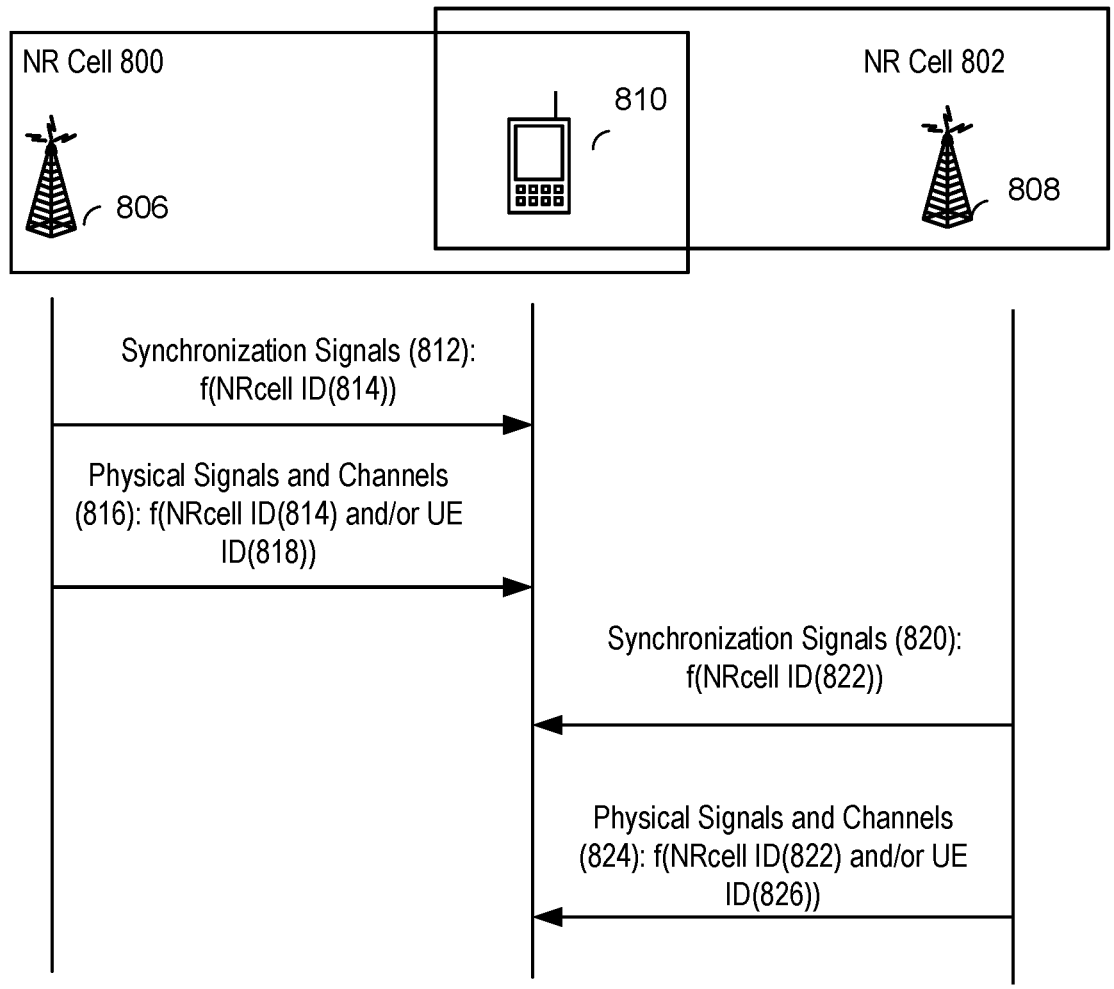
FIG. 8 illustrates synchronization signals and physical signals and channels being transmitted in two NR Cells of a NR network in accordance with the present disclosure.

The problem of changing NR Cell IDs and/or UE IDs or other UE specific parameters persists, however, in the case of a UE switching between NR Cells. For example, as shown in FIG. 8, when UE 810 switches from communicating with one or more transmit/receive points 806 (only one shown) of NR Cell 800, to communicating with one or more transmit/receive points 808 (only one shown) of different NR Cell 802, the NR Cell ID and UE ID change once again. As a result, UE 810 must go from being synchronized to synchronization channel 812 based on NR Cell ID 814, and receiving physical signals and channels 816 provisioned in accordance with NR Cell ID 814 and/or UE ID 818 assigned by the network, such as by an entity associated with NR Cell 800 (including but not limited to one or more transmit/receive points and/or access units), to synchronizing to synchronization channel 820 based on NR Cell ID 822 and receiving physical signals and channels 824 provisioned in accordance with NR Cell ID 822 and/or UE ID 826 assigned by the network, such as an entity associated with NR Cell 802 (including but not limited to one or more transmit/receive points and/or access units). Once again this wastes spectral resources, increases latency and increases processing.

Figure 9:
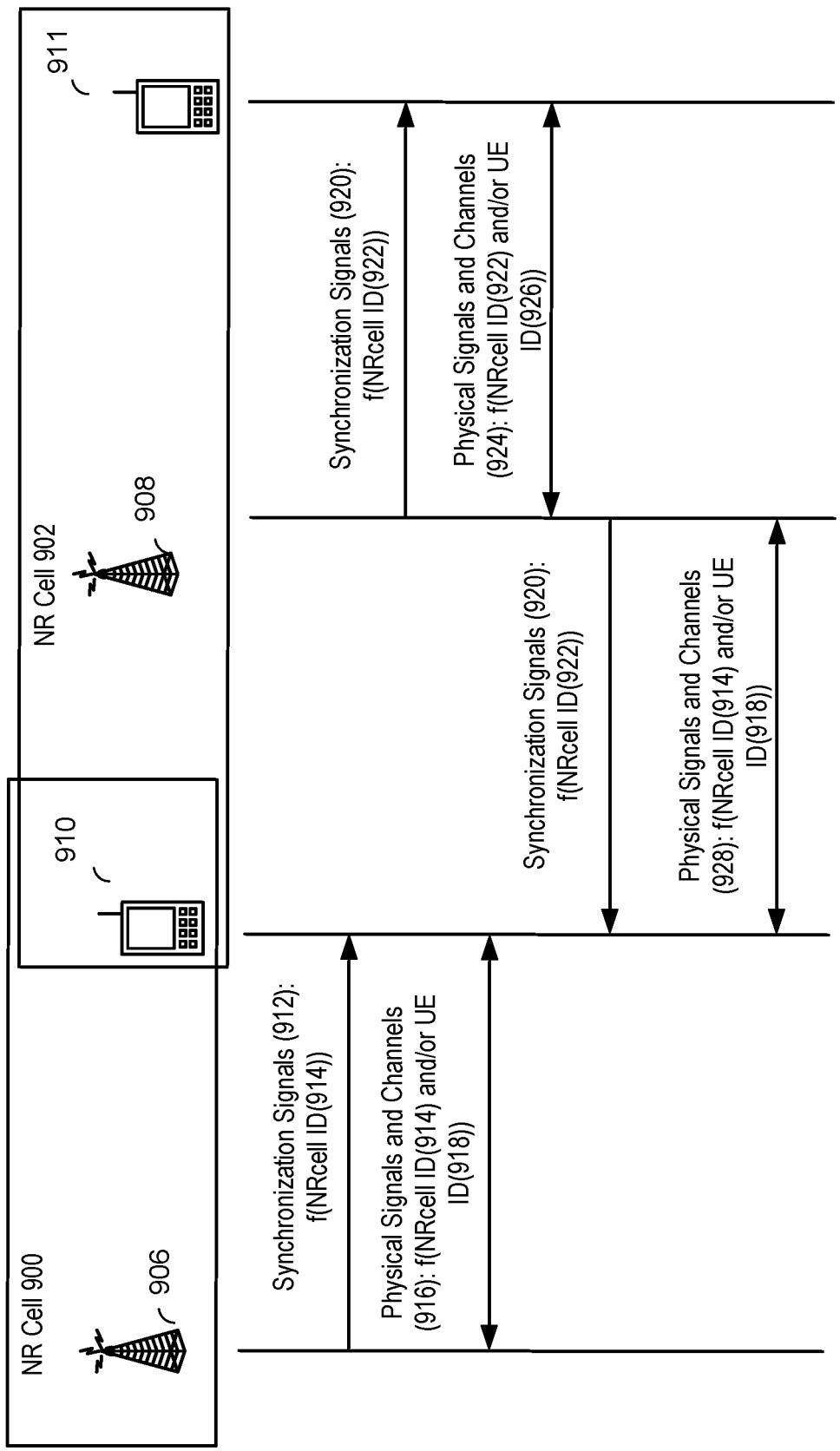
FIG. 9 illustrates synchronization signals and physical signals and channels being transmitted in two NR Cells of a NR network in accordance with the present disclosure in accordance with the present disclosure.

One embodiment for addressing the aforementioned problem is described below in conjunction with FIG. 9. As shown therein, one or more transmit/receive points 906 (only one shown) associated with NR Cell 900, transmit synchronization signals 912 based on NR Cell ID 914, and communicate with UE 910 physical signals and channels 916 provisioned based on NR Cell ID 914 and/or a UE specific parameter which in this example is UE ID 918 of UE 910, assigned by the network, such as an entity associated with NR Cell 900 (including but not limited to one or more transmit/receive points and/or access units). Also shown therein, one or more other transmit/receive points 908 (only one shown) associated with different NR Cell 902, transmit synchronization signals 920 based on NR Cell ID 922, and communicate with UE 911 physical signals and channels 924 provisioned based on NR Cell ID 922 and/or a UE specific parameter, in this example, UE ID 926 of UE 911, assigned by the network, such as an entity associated with NR Cell 902 (including but not limited to one or more transmit/receive points and/or access units). When UE 910 begins communicating with transmit/receive point(s) 908, however, for example as part of a handover from NR Cell 900 to NR Cell 902, UE 910 receives synchronization signals 920 based on NR Cell ID 922. But instead of communicating physical signals and channels that are provisioned based on NR Cell ID 922 and/or a newly assigned UE ID or other UE specific parameters of UE 910 assigned by the network, such as an entity associated with NR Cell 902 (including but not limited to one or more transmit/receive points and/or access units), UE 910 communicates physical signals and channels 928 that are provisioned based on NR Cell ID 914 and/or UE ID 918 of UE 910 that were previously assigned by the network, such as an entity associated with NR Cell 900 (including but not limited to one or more transmit/receive points and/or access units). This allows UE 910 to avoid having to obtain a new UE ID from the network and avoids the network and UE from having to provision and communicate physical signals and channels provisioned in accordance with different IDs. The synchronization signals may be transmitted in an SS block. The physical signals can include broadcast channels that are a function of Cell ID. The benefit is that the mobility interruption due to reconfiguration of physical signals and channels is minimized. This results in reducing latency and processing.

Figure 10:
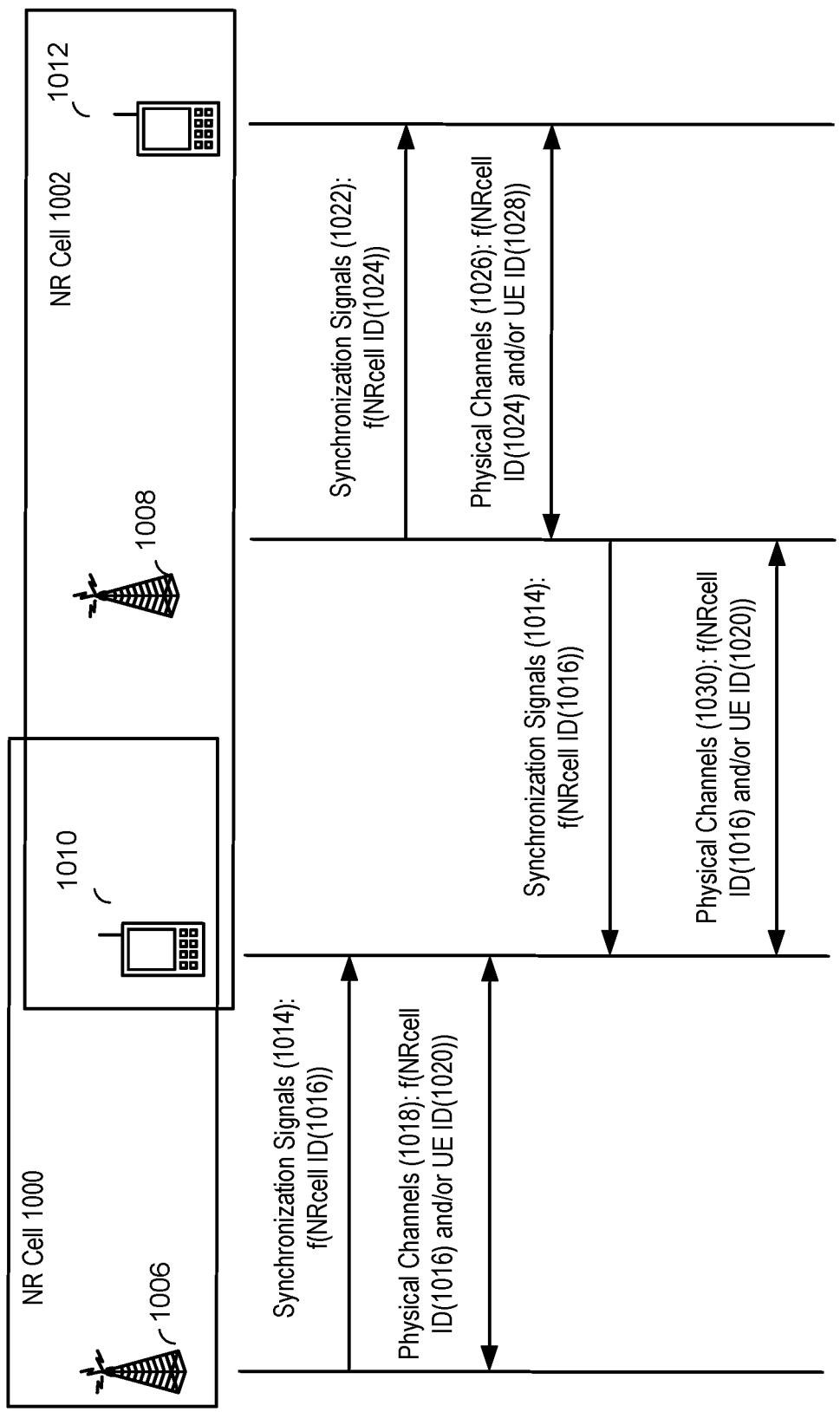
FIG. 10 illustrates synchronization signals and physical signals and channels being transmitted in two NR Cells of a NR network in accordance with the present disclosure in accordance with the present disclosure.

Another embodiment for addressing the aforementioned problem is described below in conjunction with FIG. 10. As shown therein, one or more transmit/receive points 1006 (only one shown) associated with NR Cell 1000, transmit synchronization signals 1014 based on NR Cell ID 1016, and communicate with UE 1010 physical signals and channels 1018 provisioned based on NR Cell ID 1016 and/or UE ID 1020 or another UE specific parameter assigned by the network, such as an entity associated with NR Cell 1000 (including but not limited to one or more transmit/receive points and/or access units). Also shown in FIG. 10, one or more transmit/receive point(s) 1008 associated with different NR Cell 1002, transmit synchronization signals 1022 based on NR Cell ID 1024 and communicate with UE 1012 physical signals and channels 1026 provisioned based on NR Cell ID 1024 and/or UE ID 1028 or another UE specific parameter assigned by the network, such as an entity associated with NR Cell 1002 (including but not limited to one or more transmit/receive points and/or access units). When UE 1010 begins communicating with transmit/receive point(s) 1008, however, for example as part of a handover from NR Cell 1000 to NR Cell 1002, UE 1010 receives, from transmit/receive point(s) 1008, synchronization signals 1014 provisioned based on NR Cell ID 1016 and communicates physical signals and channels 1030 provisioned based on NR Cell ID 1016 and/or UE ID 1020, or another UE specific parameter assigned by the network, such as an entity associated with NR Cell 1000 (including but not limited to one or more transmit/receive points and/or access units). In addition to avoiding having to obtain a new UE ID from the network, and avoiding the network and UE having to provision and communicate physical signals and channels provisioned in accordance with different UE IDs respectively, this approach also avoids the need for UE 1010 to synchronize to a new synchronization channel. Therefore this approach further reduces latency and processing. It also minimizes mobility interruption due to reconfiguration of physical signals and channels. The synchronization signals may be transmitted in an SS block. The transmit/receive point(s) 1008 may transmit synchronization signals 1022 based on NR Cell ID 1024 and synchronization signals 1014 based on NR Cell ID 1016 in SS blocks that are in different time, frequency and/or code resources. For example, two different frequency resources (e.g. subbands) can be configured by the network to carry SS blocks with synchronization signals 1022 and SS blocks with synchronization signals 1014 respectively. In another example, SS blocks with synchronization signals 1022 are transmitted in one or more time slots and SS blocks with synchronization signals 1014 are transmitted in another sets of time slots. The physical signals can include broadcast channels that are a function of Cell ID.

In one embodiment, in the process of handing over a UE from one NR Cell to another NR Cell, such handover procedure as described above in conjunction with various embodiments may apply to a certain communication direction (e.g. uplink or downlink) only and not the other direction. That is to say, only one of DL or UL channels and/or signals use the IDs associated with a source NR Cell, whereas for the other direction the IDs associated with target NR Cell are used. Similarly, handover may apply to a certain subset of physical signals and/or channels but not necessarily all of the physical signals and/or channels. For example, a UE performing a handover may still receive a physical control channel from the source NR Cell and data channels from the target cell or vice versa.

For UEs in connected mode, the NR system may rely on measurement reports, for example reference signal received power (RSRP) reports based on UE-specific reference signals (e.g. CSI-RS), to determine whether it should hand over UEs from one NR-cell to the other. For example, measurement reports by the UEs based on channel state information reference signals (CSI-RS s) may be used by the NR system in addition to RSRP reports based on the synchronization signals detected by the UEs. A CSI-RS sequence can be generated according to a configurable UE-specific parameter (e.g. UE ID, configurable ID, etc.), instead of NR Cell ID such that in handover scenarios CSI-RS configuration can be based on the same UE-specific parameter when the UE moves from the source NR Cell to the target NR Cell. In other embodiments, other UE-specific CSI-RS configuration parameters such as CSI-RS resource and port configuration parameters may also be shared between the source and target NR-cells in order to save (re)configuration resource overhead during handover procedure between NR-cells.

Figure 11:
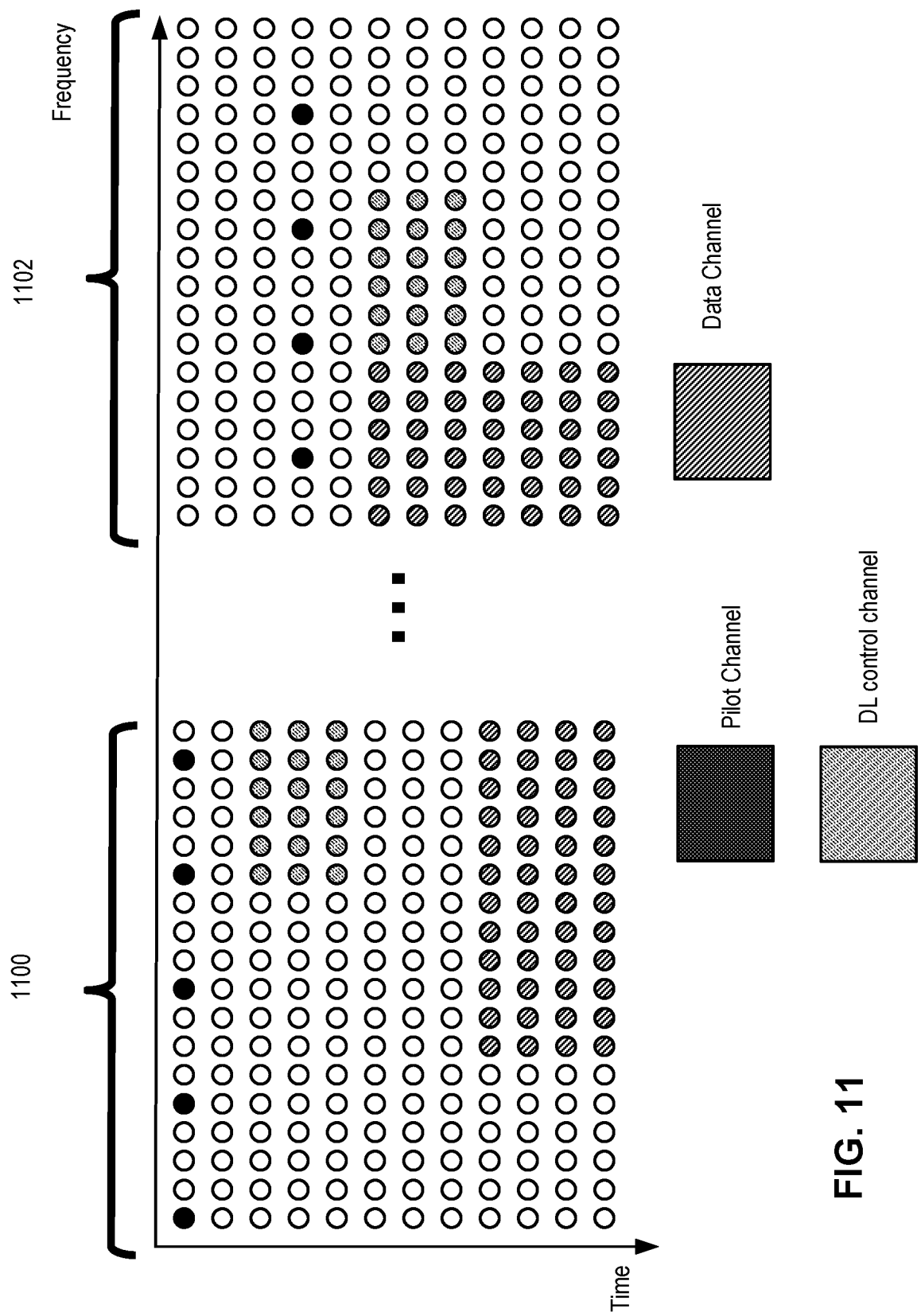
FIG. 11 illustrates physical signal and channel mapping of physical signals and channels being transmitted in two NR Cells of a NR network in accordance with the present disclosure.

One embodiment for implementing one or more transmit/receive points in an NR Cell, so as to support physical signals and channels provisioned in accordance with NR Cell IDs and/or UE IDs or other UE specific parameters associated with different NR Cells, is shown in FIG. 11. As shown therein physical signals and channels provisioned in accordance with a NR Cell ID of NR Cell 1 and/or UE specific parameters, such as a UE IDs, assigned by the network, such as an entity associated with NR Cell 1, are communicated by the one or more transmit/receive points in designated frequency range 1100, whereas physical channels provisioned in accordance with a NR Cell ID of NR Cell 2 and/or UE specific parameters, such as UE IDs, assigned by the network, such as an entity associated with the NR Cell 2, are communicated by the transmit and receive point(s) in designated frequency range 1102. Though not shown in FIG. 11 the scrambling applied and/or sequence to be used for generating these various physical signals and channels can also change, with or without the physical mappings changing.

Figure 12:
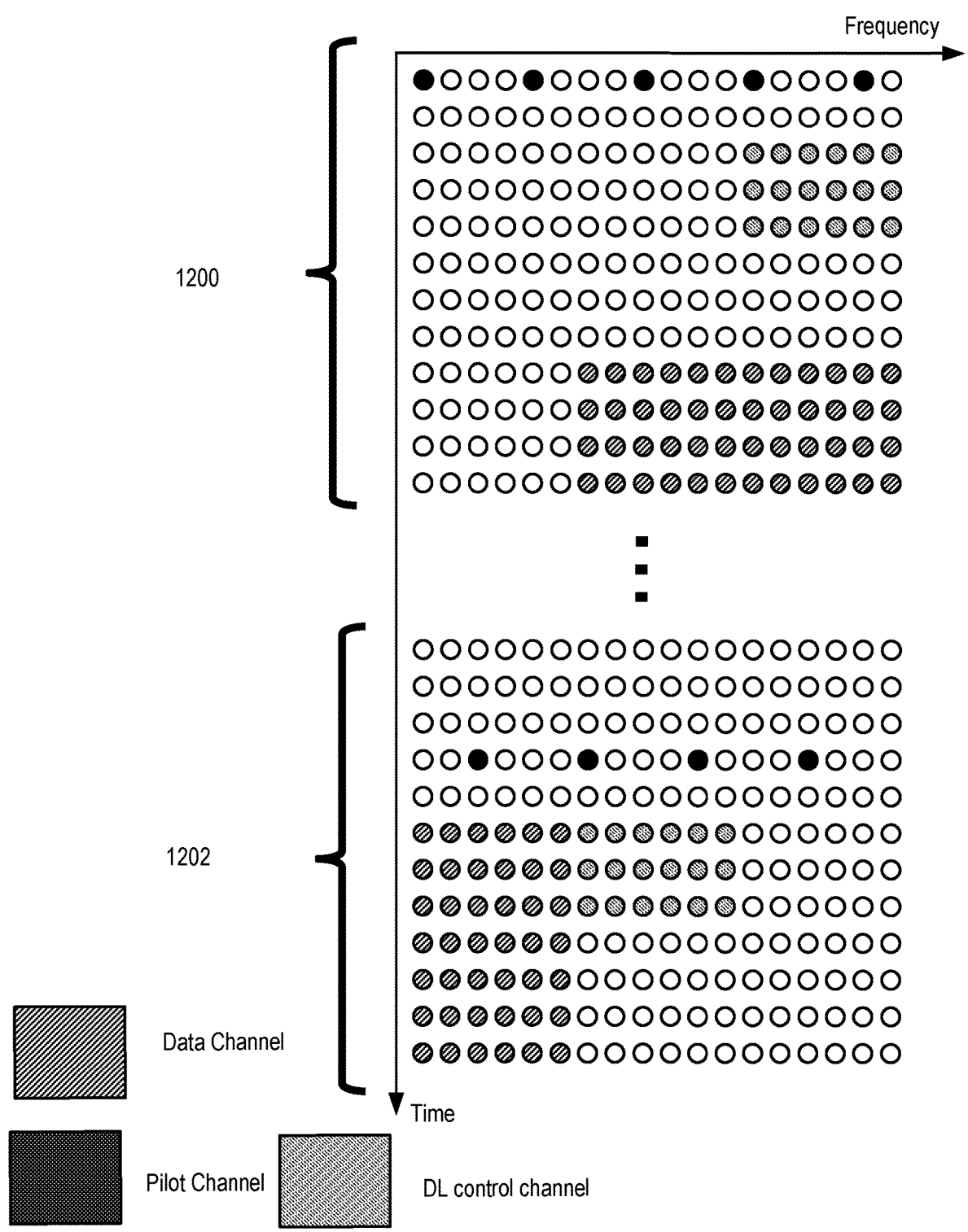
FIG. 12 illustrates physical signal and channel mapping of physical signals and channels being transmitted in two NR Cells of a NR network in accordance with the present disclosure.

Another embodiment for implementing one or more transmit/receive points in an NR Cell, so as to support physical signals and channels provisioned in accordance with NR Cell IDs and UE specific parameters associated with different NR Cells, is shown in FIG. 12. As shown therein physical channels provisioned in accordance with a NR Cell ID of NR Cell 1 and/or UE specific parameters, such as UE IDs, assigned by the network, such as an entity associated with NR Cell 1 are communicated by the one or more transmit/receive points in designated time range 1200, whereas physical channels provisioned in accordance with a NR Cell ID of NR Cell 2 and/or UE specific parameters, such as UE IDs, assigned by the network, such as an entity associated with NR Cell 2, are communicated by the transmit/receive point(s) in designated time range 1202. Though not shown in FIG. 12 the scrambling applied and/or sequence to be used for generating these various physical signals and channels can also change, with or without the physical mappings changing.

Figure 13:
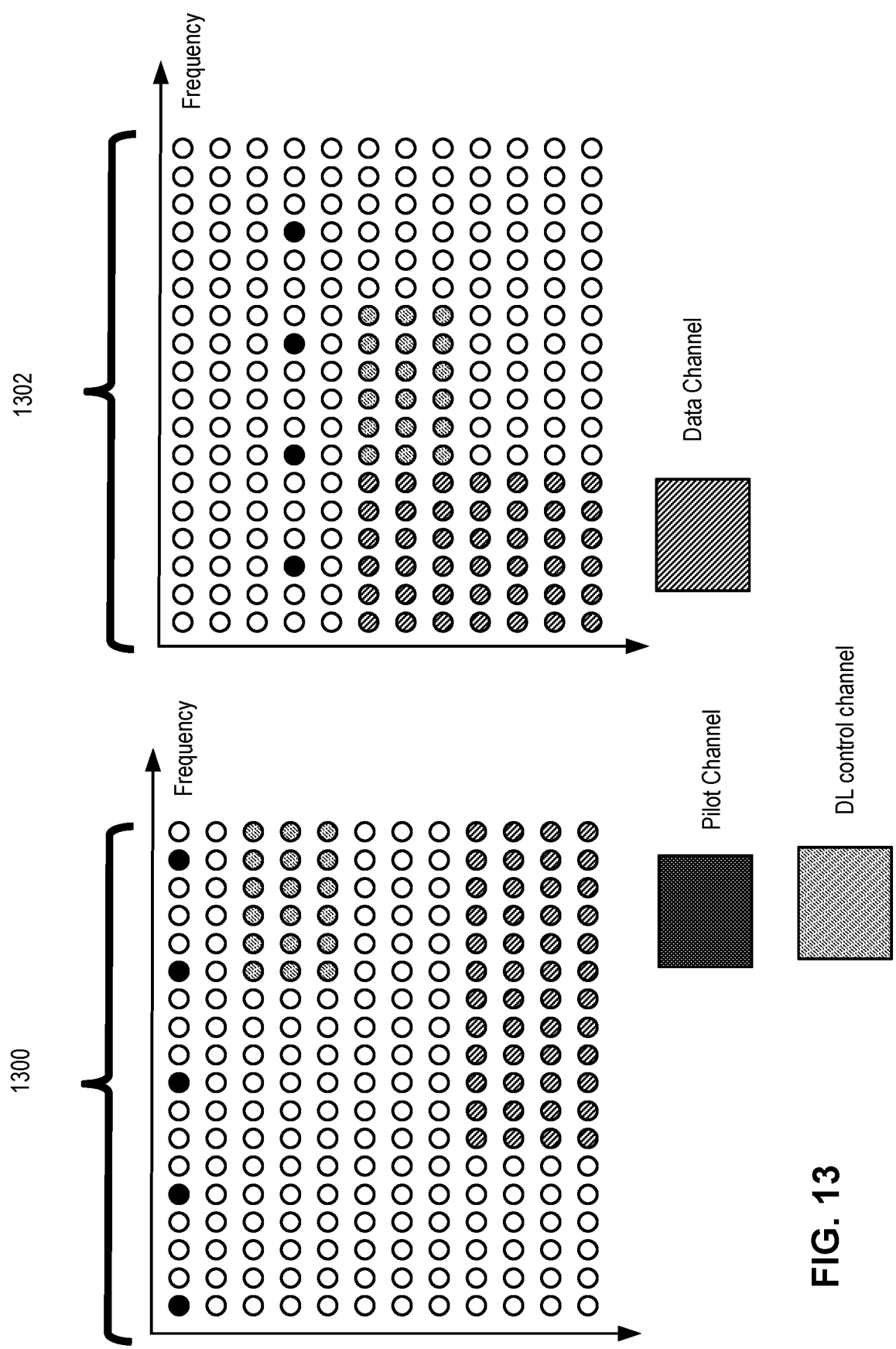
FIG. 13 illustrates physical signal and channel mapping of physical signals and channels being transmitted in two NR Cells of a NR network in accordance with the present disclosure.

Another embodiment for implementing one or more transmit/receive points in an NR Cell, so as to support physical signals and channels provisioned in accordance with NR Cell IDs and UE IDs associated with different NR Cells, is presented in the context of carrier aggregation as shown in FIG. 13. As shown therein physical signals and channels provisioned in accordance with a NR Cell ID of NR Cell 1 and/or UE specific parameters, such as UE IDs, assigned by the network, such as an entity associated with NR Cell 1 are communicated by the one or more transmit/receive point(s) in designated carrier frequency range 1300, whereas physical channels provisioned in accordance with a NR Cell ID of NR Cell 2 and/or UE specific parameters, such as UE IDs, assigned by the network, such as an entity associated with the NR Cell 2, are communicated by the transmit/receive point(s) in designated carrier frequency range 1302. According to one embodiment, a carrier frequency range is a frequency bandwidth over which an NR Cell can operate. Carrier aggregation corresponds to bandwidth extension by aggregating component carriers (CC), e.g. where a CC is a frequency range corresponding to a certain carrier frequency, in both DL and UL. Symmetric or asymmetric DL/UL CA configurations are possible. Motivation for carrier aggregation include achieving higher peak data rates, facilitating efficient use of fragmented spectrum and enabling higher data rates in typical deployments where contiguous spectrum is not an option.

The aforementioned designated frequency ranges, time ranges and carrier frequency ranges can be designated in the sense that they are intended or reserved for communications provisioned in accordance with NR Cell IDs of, and/or UE IDs or other UE specific parameters used or assigned by, respective NR Cells.

Figure 14:
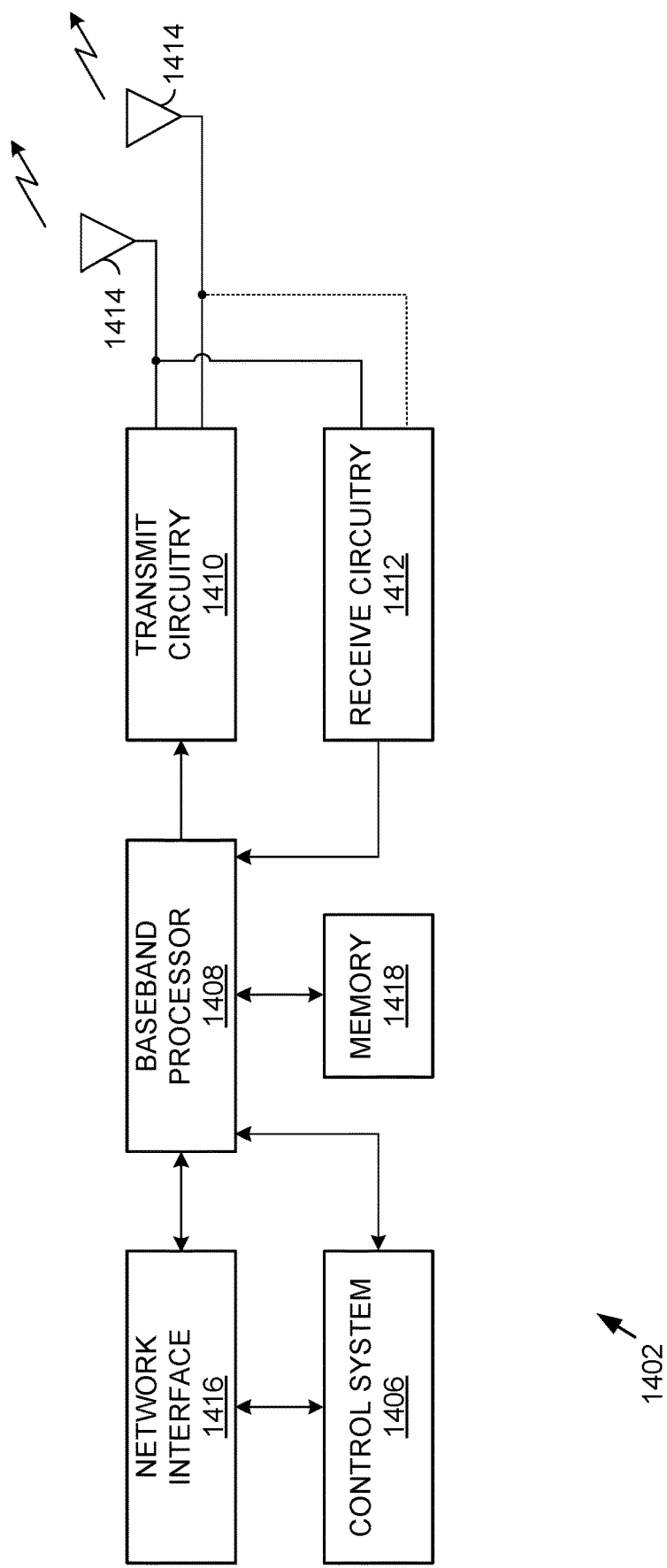
FIG. 14 illustrates a block diagram representation of a NR transmit/receive point in accordance with an embodiment of the present disclosure.

FIG. 14 illustrates a block diagram representation of a NR transmit/receive point in accordance with an embodiment of the present disclosure. A high-level description of a transmit/receive point 1402 that can be used in the NR system described above is illustrated. The transmit/receive point 1402 generally includes a control system 1406, a baseband processor 1408, memory 1418, transmit circuitry 1410, receive circuitry 1412, multiple antennas 1414, and interfaces 1416 which can include network interfaces including an Xn interface. Collectively transmit circuitry 1410 and receive circuitry 1412 is referred to as "transceiver circuitry." The memory 1418 may be any type of memory capable of storing software and data. The receive circuitry 1412 receives radio frequency signals bearing information from one or more remote UEs as will be described in conjunction with FIG. 15. Preferably, a low noise amplifier and a filter (not shown) cooperate to amplify and remove broadband interference from the signal for processing. down-conversion and digitization circuitry (not shown) will then downconvert the filtered, received signal to an intermediate or baseband frequency signal, which is then digitized into one or more digital streams.

The baseband processor (base band processor circuitry) 1408 processes the digitized received signal to extract the information or data bits conveyed in the received signal. This processing typically includes demodulation, decoding, and error correction operations. As such, the baseband processor 1408 is generally implemented in one or more DSPs or application-specific integrated circuits (ASICs). The received information is then sent to an associated network via the network interface 1416 or transmitted to another mobile terminal serviced by the transmit/receive point 1402.

On the transmit side, the baseband processor 1408 receives digitized data, which may represent voice, data, or control information, from the network interface 1416 under the control of the control system 1406, and encodes the data for transmission. The encoded data is output to the transmit circuitry 1410, where it is modulated by a carrier signal having a desired transmit frequency or frequencies. A power amplifier (not shown) will amplify the modulated carrier signal to a level appropriate for transmission, and deliver the modulated carrier signal to the antennas 1414 through a matching network (not shown). The transmit/receive point 1402 may transmit signals using multiple antennas 1414, but may receive signals using a single antenna 1414, or vice versa.

With respect to the central access units describe earlier, a similar architecture to that for a transmit/receive point in FIG. 14 could be used but with different interfaces and transmit/receive circuitry. For example, the transmit/receive circuitry may be for optical, DSL or any other communication scheme. If collocated with a transmit/receive point, a central access unit could reuse the baseband processor and other components of the transmit/receive point as necessary (e.g. interfaces for communicating with other transmit/receive points such as an Xn interface).

Figure 15:
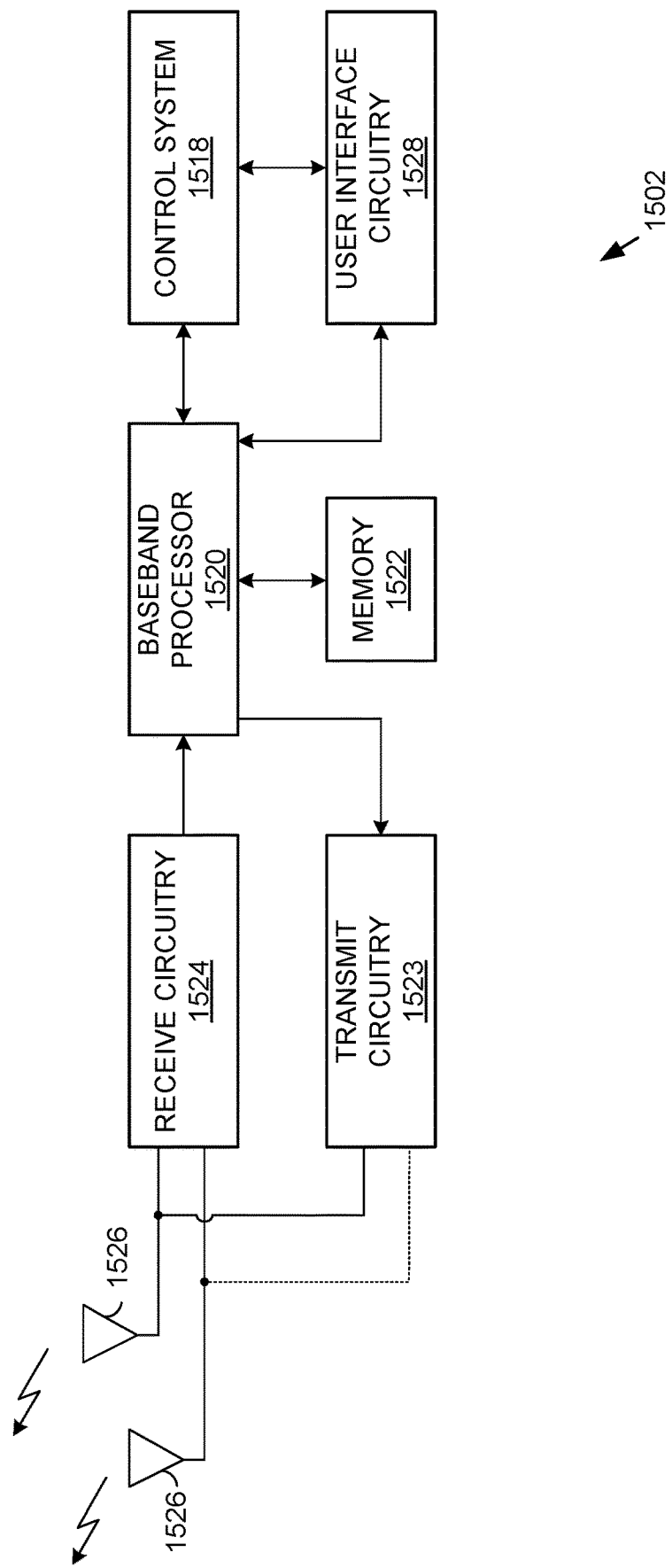
FIG. 15 illustrates a block diagram representation of a NR UE in accordance with an embodiment of the present disclosure.

FIG. 15 illustrates a block diagram representation of a NR UE in accordance with an embodiment of the present disclosure. A high-level description of the components of UE 1502 is shown. Similarly, to the transmit/receive point 1402, the UE 1502 will include a control system 1518, a baseband processor (baseband processor circuitry) 1520, memory 1522, transmit circuitry 1523, receive circuitry 1524, multiple antennas 1526, and user interface circuitry 1528. Collectively transmit circuitry 1523 and receive circuitry 1524 is referred to as "transceiver circuitry." The receive circuitry 1524 receives radio frequency signals bearing information from one or more transmit/receive points 1402. Preferably, a low noise amplifier and a filter (not shown) cooperate to amplify and remove broadband interference from the signal for processing. Down conversion and digitization circuitry (not shown) will then down convert the filtered, received signal to an intermediate or baseband frequency signal, which is then digitized into one or more digital streams.

The baseband processor 1520 processes the digitized received signal to extract the information or data bits conveyed in the received signal. This processing typically includes demodulation, decoding, and error correction operations. The baseband processor 1520 is generally implemented in one or more DSP, ASIC, or both.

For transmission, the baseband processor 1520 receives digitized data, which may represent voice, data, or control information, from the control system 1518 or the interface circuitry 1528, which it encodes for transmission. The encoded data is output to the transmit circuitry 1522, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 1526 through a matching network (not shown). The UE 1504 may receive signals using both antennas 1526, but transmits signals using a single antenna 1526. Various modulation and processing techniques available to those skilled in the art are applicable.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation may require the performance of an Inverse Discrete Fourier Transform (IDFT) on the information to be transmitted. For demodulation, the performance of a Discrete Fourier Transform (DFT) on the received signal is required to recover the transmitted information. In practice, the IDFT and DFT may be provided by digital signal processing carrying out an Inverse Fast Fourier Transform (IFFT) and Fast Fourier Transform (FFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Single Carrier FDMA (SC-FDMA) modulation differs from OFDM modulation in that SC-FDMA uses a DFT block before mapping symbols to sub-carriers and that it uses a parallel-to-serial unit after the IFDT block.

OFDM may be used for at least the downlink transmission from the transmit/receive points 1402 to the mobile terminals 1502. Each transmit/receive point 1402 is equipped with n transmit antennas 1414, and each mobile terminal 1502 is equipped with m receive antennas 1526. Notably, the respective antennas can be used for reception and transmission using appropriate duplexers or switches. SC-FDMA may be used for uplink transmissions to the transmit/receive point.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," "baseband processor," and/or "processing unit" or their equivalents may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the present disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the present disclosure. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
receiving from or transmitting to a first cell associated with a first cell identifier (ID), by an apparatus, a first signal or channel, wherein the first signal or channel is based on a first user equipment specific parameter associated with the first cell ID and is received from the first cell in a first frequency bandwidth of a component carrier; and
receiving from or transmitting to a second cell associated with a second cell ID, by the apparatus, a second signal or channel, wherein the second signal or channel is based on a second user equipment specific parameter associated with the second cell ID and is received from the second cell in a second frequency bandwidth of the component carrier, wherein the first user equipment specific parameter and the second user equipment specific parameter are the same, and wherein the second cell is different from the first cell.

2. The method of claim 1, wherein the first frequency bandwidth and the second frequency bandwidth are the same or overlap.

3. The method of claim 1, wherein the first user equipment specific parameter comprises a first user equipment identifier, and wherein the second user equipment specific parameter comprises a second user equipment identifier.

4. The method of claim 1, wherein the first signal or channel includes one or more of a dedicated control channel, a data channel, or a synchronization signal.

5. The method of claim 1, wherein the first user equipment specific parameter is assigned by a network device associated with the first cell.

6. An apparatus comprising:
a memory storage comprising instructions; and
one or more processors coupled to the memory storage, wherein the instructions are executable on the one or more processors to cause the apparatus to:
receive from or transmit to a first cell associated with a first cell identifier (ID) a first signal or channel, wherein the first signal or channel is based on a first user equipment specific parameter associated with the first cell ID and is received from the first cell in a first frequency bandwidth of a component carrier; and
receive from or transmitting to a second cell associated with a second cell ID a second signal or channel, wherein the second signal or channel is based on a second user equipment specific parameter associated with the second cell ID and is received from the second cell in a second frequency bandwidth of the component carrier, wherein the first user equipment specific parameter associated with the first cell and the second user equipment specific parameter associated with the second cell are the same, and wherein the first cell is different from the second cell.

7. The apparatus of claim 6, wherein the first frequency bandwidth and the second frequency bandwidth are the same or overlap.

8. The apparatus of claim 6, wherein the first user equipment specific parameter comprises a first user equipment identifier, and wherein the second user equipment specific parameter comprises a second user equipment identifier.

9. The apparatus of claim 6, wherein the first signal or channel includes one or more of a dedicated control channel, a data channel, or a synchronization signal.

10. The apparatus of claim 6, wherein the first user equipment specific parameter is assigned by a network device associated with the first cell.

11. A method comprising:
receiving from or transmitting to a user equipment, by a first base station of a first cell associated with a first cell identifier (ID), a first signal or channel, wherein the first signal or channel is based on a first user equipment specific parameter associated with the first cell ID and is received from the first cell in a first frequency bandwidth of a component carrier; and
receiving from or transmitting to the user equipment, by a second base station of a second cell associated with a second cell ID, a second signal or channel, wherein the second signal or channel is based on a second user equipment specific parameter associated with the second cell ID and is received from the second cell in a second frequency bandwidth of the component carrier, wherein the first user equipment specific parameter and the second user equipment specific parameter are the same, and wherein the second cell is different from the first cell.

12. The method of claim 11, wherein the first frequency bandwidth and the second frequency bandwidth are the same or overlap.

13. The method of claim 11, wherein the first user equipment specific parameter comprises a first user equipment identifier, and wherein the second user equipment specific parameter comprises a second user equipment identifier.

14. The method of claim 11, wherein the first signal or channel includes one or more of a dedicated control channel, a data channel, or a synchronization signal.

15. The method of claim 11, wherein the first user equipment specific parameter is assigned by a network device associated with the first cell.

16. A system comprising:
a first base station of a first cell associated with a first cell identifier (ID); and
a second base station of a second cell associated with a second cell ID,
wherein the first base station includes:
a first memory storage comprising first instructions; and
first one or more processors coupled to the first memory storage, wherein the first instructions are executable on the first one or more processors to cause the first base station to:
receive from or transmit to a user equipment a first signal or channel, wherein the first signal or channel is based on a first user equipment specific parameter associated with the first cell ID and is received from the first cell in a first frequency bandwidth of a component carrier, and
wherein the second base station includes:
a second memory storage comprising second instructions; and
second one or more processors coupled to the second memory storage, wherein the second instructions are executable on the second one or more processors to cause the second base station to:
receive from or transmit to the user equipment a second signal or channel, wherein the second signal or channel is based on a second user equipment specific parameter associated with the second cell ID and is received from the second cell in a second frequency bandwidth of the component carrier, wherein the first user equipment specific parameter and the second user equipment specific parameter are the same, and wherein the second cell is different from the first cell.

17. The system of claim 16, wherein the first frequency bandwidth and the second frequency bandwidth are the same or overlap.

18. The system of claim 16, wherein the first user equipment specific parameter comprises a first user equipment identifier, and wherein the second user equipment specific parameter comprises a second user equipment identifier.

19. The system of claim 16, wherein the first signal or channel includes one or more of a dedicated control channel, a data channel, or a synchronization signal.

20. The system of claim 16, wherein the first user equipment specific parameter is assigned by a network device associated with the first cell.

* * * * *